US008658309B2

(12) United States Patent
Yazami

(10) Patent No.: US 8,658,309 B2
(45) Date of Patent: Feb. 25, 2014

(54) DISSOCIATING AGENTS, FORMULATIONS AND METHODS PROVIDING ENHANCED SOLUBILITY OF FLUORIDES

(75) Inventor: Rachid Yazami, Los Angeles, CA (US)

(73) Assignees: California Institute of Technology, Pasadena, CA (US); Centre National de la Recherche Scientifique (C.N.R.S.), Paris (FR)

( * ) Notice: Subject to any disclaimer, the term of this patent is extended or adjusted under 35 U.S.C. 154(b) by 1595 days.

(21) Appl. No.: 11/837,004

(22) Filed: Aug. 10, 2007

(65) Prior Publication Data

US 2008/0171268 A1    Jul. 17, 2008

Related U.S. Application Data

(63) Continuation-in-part of application No. 11/681,493, filed on Mar. 2, 2007.

(60) Provisional application No. 60/837,174, filed on Aug. 11, 2006.

(51) Int. Cl.
*H01M 6/04* (2006.01)
*H01M 6/16* (2006.01)

(52) U.S. Cl.
USPC .......................................... 429/188; 429/341

(58) Field of Classification Search
None
See application file for complete search history.

(56) References Cited

U.S. PATENT DOCUMENTS

| | | |
|---|---|---|
| 3,536,532 A | 10/1970 | Watanabe et al. |
| 3,700,502 A | 10/1972 | Wantanabe et al. |
| 3,796,604 A | 3/1974 | Gabano et al. |
| 3,796,605 A | 3/1974 | Dechenaux et al. |
| 3,915,743 A | 10/1975 | Lauck |
| 3,956,018 A | 5/1976 | Kozawa |
| 4,052,539 A | 10/1977 | Shropshire et al. |
| 4,119,655 A | 10/1978 | Hulme |
| 4,247,608 A | 1/1981 | Watanabe et al. |
| 4,431,567 A | 2/1984 | Gestaut et al. |
| 4,438,086 A | 3/1984 | Armaki et al. |

(Continued)

FOREIGN PATENT DOCUMENTS

| | | |
|---|---|---|
| EP | 0 776 053 | 5/1997 |
| EP | 0 938 151 | 8/1999 |

(Continued)

OTHER PUBLICATIONS

International Search Report, Corresponding to International Application No. PCT/US07/75697, Mailed Sep. 15, 2008.

(Continued)

*Primary Examiner* — Barbara Gilliam
*Assistant Examiner* — Adam A Arciero
(74) *Attorney, Agent, or Firm* — Lathrop & Gage LLP

(57) ABSTRACT

The present invention provides compositions, formulations and methods providing for the effective dissolution of inorganic fluorides in solvents via incorporation of a dissociating agent component. Dissociating agents of the present invention participate in chemical reactions in solution, such as complex formation, acid-base reactions, and adduct formation reactions, that result in enhancement in the dissolution of inorganic fluorides in a range of solvent environments. Dissociating agents comprising Lewis acids, Lewis bases, anion receptors, cation receptors or combinations thereof are provided that significantly increase the extent of dissolution of a range of inorganic fluorides, particularly inorganic fluorides, such as LiF, that are highly insoluble in many solvents in the absence of the dissociating agents of the present invention.

50 Claims, 5 Drawing Sheets

(56) References Cited

U.S. PATENT DOCUMENTS

| | | | |
|---|---|---|---|
| 4,753,786 A | 6/1988 | Watanabe et al. | |
| 4,830,938 A | 5/1989 | McCullough et al. | |
| 4,840,859 A | 6/1989 | Williams et al. | |
| 4,865,931 A | 9/1989 | McCullough et al. | |
| 5,114,811 A | 5/1992 | Ebel et al. | |
| 5,116,592 A | 5/1992 | Weinberg | |
| 5,130,211 A * | 7/1992 | Wilkinson et al. | 429/331 |
| 5,151,162 A | 9/1992 | Muller et al. | |
| 5,175,066 A | 12/1992 | Hamwi et al. | |
| 5,443,930 A | 8/1995 | Shoji et al. | |
| 5,518,836 A | 5/1996 | McCullough | |
| 5,532,083 A | 7/1996 | McCullough | |
| 5,534,370 A | 7/1996 | Kita et al. | |
| 5,702,844 A | 12/1997 | Bernard et al. | |
| 5,705,689 A | 1/1998 | Lee et al. | |
| 5,712,062 A | 1/1998 | Yamana et al. | |
| 5,789,585 A | 8/1998 | Lee et al. | |
| 5,916,642 A | 6/1999 | Chang | |
| 5,968,683 A | 10/1999 | Kolb | |
| 6,022,643 A | 2/2000 | Lee et al. | |
| 6,068,921 A | 5/2000 | Yamana et al. | |
| 6,077,624 A | 6/2000 | Mitchell et al. | |
| 6,100,324 A | 8/2000 | Choi et al. | |
| 6,120,941 A | 9/2000 | Lee et al. | |
| 6,203,814 B1 | 3/2001 | Fisher et al. | |
| 6,245,465 B1 | 6/2001 | Angell et al. | |
| 6,268,430 B1 | 7/2001 | Choi et al. | |
| 6,306,540 B1 | 10/2001 | Hiroi et al. | |
| 6,334,939 B1 | 1/2002 | Zhou et al. | |
| 6,352,798 B1 | 3/2002 | Lee et al. | |
| 6,358,649 B1 | 3/2002 | Yazami et al. | |
| 6,479,192 B1 | 11/2002 | Chung et al. | |
| 6,482,550 B1 | 11/2002 | Imachi et al. | |
| 6,489,055 B1 | 12/2002 | Ichihashi et al. | |
| 6,528,208 B1 | 3/2003 | Thackeray et al. | |
| 6,580,006 B1 | 6/2003 | Lamanna | |
| 6,586,133 B1 | 7/2003 | Teeteus et al. | |
| 6,589,299 B2 | 7/2003 | Missling et al. | |
| 6,638,662 B2 | 10/2003 | Kaneda et al. | |
| 6,649,033 B2 | 11/2003 | Yagi et al. | |
| 6,709,566 B2 | 3/2004 | Cumings et al. | |
| 6,713,214 B2 | 3/2004 | Koga et al. | |
| 6,743,547 B2 | 6/2004 | Gan et al. | |
| 6,743,549 B1 | 6/2004 | Doyle et al. | |
| 6,767,671 B2 | 7/2004 | Itagaki et al. | |
| 6,841,610 B2 | 1/2005 | Yanagisawa | |
| 6,844,115 B2 | 1/2005 | Gan et al. | |
| 6,852,446 B2 | 2/2005 | Barbarich | |
| 6,852,449 B2 | 2/2005 | Nagata et al. | |
| 6,926,991 B2 | 8/2005 | Gan et al. | |
| 6,939,383 B2 | 9/2005 | Eastin et al. | |
| 6,958,198 B2 | 10/2005 | Iwamoto et al. | |
| 6,986,967 B2 | 1/2006 | Barton et al. | |
| 7,005,211 B2 | 2/2006 | Kim et al. | |
| 7,074,525 B2 | 7/2006 | Arai et al. | |
| 7,087,348 B2 | 8/2006 | Holman et al. | |
| 2002/0081492 A1 | 6/2002 | Gan et al. | |
| 2002/0119371 A1 | 8/2002 | Haug et al. | |
| 2002/0127171 A1 | 9/2002 | Smalley et al. | |
| 2002/0177041 A1 | 11/2002 | Worle et al. | |
| 2002/0182506 A1 | 12/2002 | Cagle | |
| 2003/0003370 A1 | 1/2003 | Arai et al. | |
| 2003/0049535 A1 | 3/2003 | Ohta et al. | |
| 2003/0108799 A1 | 6/2003 | Lascaud et al. | |
| 2003/0158310 A1 | 8/2003 | Asano et al. | |
| 2003/0224168 A1 | 12/2003 | Mack et al. | |
| 2004/0013814 A1 | 1/2004 | Guerfi et al. | |
| 2004/0048160 A1 | 3/2004 | Omaru | |
| 2004/0058247 A1 | 3/2004 | Omaru | |
| 2004/0091783 A1 | 5/2004 | Cagle | |
| 2004/0106047 A1 | 6/2004 | Mie et al. | |
| 2004/0131859 A1 | 7/2004 | Yerushalmi-Rozen et al. | |
| 2004/0258986 A1 | 12/2004 | Shen et al. | |
| 2005/0006623 A1 | 1/2005 | Wong et al. | |
| 2005/0011710 A1 | 1/2005 | Hitchcock et al. | |
| 2005/0026044 A1 | 2/2005 | Koike et al. | |
| 2005/0069778 A1 | 3/2005 | Bonnet et al. | |
| 2005/0118512 A1 | 6/2005 | Onuki et al. | |
| 2005/0123835 A1 | 6/2005 | Sun | |
| 2005/0170251 A1 | 8/2005 | Jung et al. | |
| 2005/0207966 A1 | 9/2005 | Zaghib | |
| 2005/0227146 A1 | 10/2005 | Ghantous et al. | |
| 2006/0269834 A1 | 11/2006 | West et al. | |
| 2007/0037063 A1 | 2/2007 | Choi et al. | |

FOREIGN PATENT DOCUMENTS

| | | |
|---|---|---|
| EP | 1 019 975 | 7/2000 |
| EP | 1 028 476 | 8/2000 |
| EP | 1 205 003 | 5/2002 |
| EP | 1 230 708 | 8/2002 |
| EP | 1 236 239 | 9/2002 |
| EP | 1 520 318 | 4/2005 |
| EP | 1 551 069 | 7/2005 |
| EP | 1 873 850 | 1/2008 |
| FR | 2856674 | 12/2004 |
| JP | 11214037 | 8/1999 |
| JP | 2000106188 | 4/2000 |
| JP | 2000200604 | 7/2000 |
| JP | 2003187799 | 7/2003 |
| JP | 2005113361 | 4/2005 |
| JP | 2005285440 | 10/2005 |
| SU | 584369 | 12/1977 |
| WO | WO 97/02580 | 1/1997 |
| WO | WO 99/34470 | 7/1999 |
| WO | WO 01/94260 | 12/2001 |
| WO | WO 02/03430 | 1/2002 |
| WO | WO 03/004410 | 1/2003 |
| WO | WO 03/031050 | 4/2003 |
| WO | WO 03/040446 | 5/2003 |
| WO | WO03/043102 | 5/2003 |
| WO | WO 2004/051784 | 6/2004 |
| WO | WO 2004/088769 | 10/2004 |
| WO | WO 2004/090921 | 10/2004 |
| WO | WO 2004/096704 | 11/2004 |
| WO | WO2006/101779 | 9/2006 |

OTHER PUBLICATIONS

Written Opinion, Corresponding to International Application No. PCT/US/07/75697, Mailed Sep. 15, 2008.

Abidi et al. (2003) "Alkali Metal Ion Complexes of Functionalized Calizarenes—Competition Between Pendent Arm and Anion Bond to Sodium," *Org. Biomol. Chem.* 1:3144-3146.

Arnold et al. (1987) "Evidence for Cryptand-Like Behavior in Bibracchial Lariat Ether (BiBLE) Complexes Obtained from X-Ray Crystallography and Solution Thermodynamic Studies," *J. Am. Chem. Soc.* 109:3716-3721.

Arora et al. (2004) "Battery Separators," *Chem. Rev.*, 104:4419-4462.

Audier et al. (1981) "Crystallographic Orientations of Catalytic Particles in Filamentous Carbon; Case of Simple Conical Particles," *J. Cryst. Growth* 55:549-556.

Banerjee et al. (2003) "Rational Chemical Strategies for Carbon Nanotube Functionalization," *Chem. Eur. J.* 9:1898-1908.

Basire et al. (2000) "Evolution of the Lamellar Structure During Crystallization of a Semicrystalline-Amorphous Polymer Blend: Time-Resolved Hot-Stage SPM Study," *Phys. Rev. Lett.* 85:5587-5590.

Beer et al. (2003) "Transition Metal and Organometallic Anion Complexation Agents," *Coord. Chem. Rev.* 240:167-189.

Bertani et al. (1999) "$^{19}F/^{29}Si$ Distance Determination in Fluoride-Containing Octadecasil by Hartmann-Hahn Corss-Polarization Under Fast Magic-Angle Spinning," *Solid State Magn. Res.* 13:219-229.

Bethune et al. (1993) "Cobalt-Catalyzed Growth of Carbon Nanotubes with Single-Atomic0Layer Walls," *Nature* 363:605-607.

Bitter et al. (1998) "Studies on Calix(aza)crowns, II. Synthesis of Novel Proximal Doubly Bridged Calix[4]arenes by Intramolecular Ring Closure of Syn 1,3- and 1,2- to ώ -Chloroalkylamides," *Tetrahedron* 54:3857-3870.

(56) References Cited

OTHER PUBLICATIONS

Blesa et al. (2006) "Bis(calixcrown)tetrathiafuvalene Receptors," *Chem. Eur. J.* 12:1906-1914.
Blumberg, W.E. (1960) "Nuclear Spin Lattice Relaxation Caused by Paramagnetic Impurities," *Phys. Rev.* 119:79-84.
Bonnamy et al. (1999) "Carbonization of Various Precursors. Effect of Heating Rate: Part II: Transmission Electron Microscopy and Physicochemical Studies," *Carbon* 37:1707-1724.
Bonnamy et al. (1999) "Carbonizaion of Various Preursors. Effect of Heating Rate: Part I: Optical Microscopy Studies,"*Carbon* 37:1691-1705.
Bourderau et al. (1999) "Amorphous Silicon as a Possile Anode Material for Li-ion Batteries," *J. Power Sources* 81:233-236.
Bruce, G. (2005) "Development of a CFx D Cell for Man Portable Apllications," In; Joint Service Power Expo, Power Point Presentation.
Bulusheva et al. (2002) "Atomic Arrangement and Electronic Structure of Graphite Fluoride C2F," *Phys. Low-Dim. Struct.* 7/8:1-14.
Cassell et al. (1999) "Large Scale CVD Synthesis of Single-Walled Carbon Nanotubes," *J. Phys. Chem. B* 103(31):6484-6492.
Chamssedine et al. (2007) "Reactivity of Carbon Nanofibers with Fluorine Gas," *Chem. Mater.* 19:161-172.
Charlier et al. (1993) "First Principles Study of Graphite Monofluoride $(CF)_n$," Phys. Rev. 8, 47:16162-16168.
Chevalier et al. (1994) "Anionic Intercalation in $La_2CuO_4$ Oxide by Fluorine or Chlorine Treatment," *Mol. Cryst. Liq. Cryst.* 244:135-142.
Cheng et al. (1998) "Large-Scale and Low-Cost Synthesis of Single-Walled Carbon Nanotubes by the Catalytic Pyrolysis of Hydrocarbons," *Appl. Phys. Lett.* 72(25):3282-3284.
Chiang et al. (2001) Purification and Characterization of Single-Walled Carbon Nanotubes (SWNTs) Obtained from the Gas-Phase Decomposition of CO (HiPco Process) *J. Phys. Chem. B* 105:8297-8301.
Chieu et al. (1982) "Raman Studies of Benzene-Derived Graphite Fibers," *Phys. Rev. B* 26:5867-.
Chung et al. (1995) "Electrochemical Behavior of Calix[4]arenediquinones and Their Cation Binding Properties," *J. Electroanalytical Chem.* 396:431-439.
Dahn et al. (2000) "Energy and Capacity Projections for Practical Dual-Graphite Cells," *J. Electrochem. Soc.* 147(3):899-901.
Davidson (2003) "Lithium Batteries, Molecular Expressions, Electricity and Magnetism," Florida State Univ., http://micro.magnet.fsu.edu/electromag/electricity/batteries/lithium.html , Downloaded Dec. 15, 2005.
De Jong et al. (2000) "Carbon Nanofibers: Catalytic Synthesis and Applications," *Catalysis Reviews-Science and Engineering* 42:481-510.
Derf et al. (2001) "Tetrathiafulvalene Crowns: Redox Switchable Ligands," *Chem. Eur. J.* 7(2):447-455.
Dietrich (1993) "Desgn of Anion Receptors: Applications," *Pure Apple. Chem.* 65(7):1457-1464.
Ding et al. (2001) "Change of Conductivity with Salt Content, Solvent Composition, and Temperature for Electrolytes of LiPF6 in Ethylene Carbonate-Ethyl Methyl Carbonate," *J. Electrochem. Soc.* 148(10):A1196-A1204.
Dresselhaus et al. (1981) "Intercalation Compounds of Graphite," *Adv. Phys.* 30(2):139-326.
Dubois et al. (2006) "EPR and Solid-State NMR Studies of Poly(dicarbon monofluoride) $(C_2F)_n$," *J. Phys. Chem. B.* 110:11800-11808.
Dubois et al. (2004) "NMR and EPR Studies of Room Temperature Highly Fluorinated Graphite Heat-Treated Under Fluorine Atmosphere," *Carbon* 42:1931-1940.
Duclaux, L. (2002) "Review of the Doping of Carbon Nanotubes (Multiwalled and Single-Walled)," *Carbon* 40:1751-1764.
Duesberg et al. (1998) "Chromatographic Size Separation of Single-Wall Carbon Nanotubes," *Appl. Phys. A* 67:117-119.
Duijvestjn et al. (1983) "$^{13}$C NMR Spectroscopy in Diamonds Using Dynamic Nuclear Polarization," *Chem. Phys. Lett.* 102:25-28.

Ebert et al. (1974) "Carbon Monofluoride. Evidence for a Structure Containing an Infinite Array of Cyclohexane Boats," *J. Am. Chem Soc.*, 96:7841-7842.
Ehrlich, G.M. (2001) "Lithium-Ion Batteries," In; *Handbook of Batteries*, 3$^{rd}$ ed., Ch. 35, New York, McGraw Hill, pp. 35.1-35.90.
Endo, M. (1988) "Grow Carbon Fibers in the Varpor Phase," *Chemtech* :568-576.
Feng et al. (2003) "Removal of Some Impurities From Carbon Nanotubes," *Chem. Phys. Lett.* 375:645-648.
Frank et al. (1975) "Preparation and Crystal-Structure of $Li_3SN_5$ and Structural Relations Between Phases of Systems Li-SN and Li-PB," *Z. Naturforsch. B* 30:316-322.
Fujimoto (1997) "Structure Analysis of Graphite Fluoride by Rietveld Method," *Carbon*, 35:1061-1065.
Furdin, G. (1998) "Exfoliation Process and Elaboration of New Carbonaceous Materials," *Fuel* 77(6):479-485.
Giraudet et al. (2006) "Solid-State NMR Studies of Covalent Graphite Fluorides $(CF)_n$ and $(C_2F)_n$," *J. Phys. Chem. Solids* 67(5-6):1100-1105.
Giraudet et al. (2005) "Solid-State $^{19}$F and $^{13}$C NMR of Room Temperature Fluorinated Graphite and Samples Thermally Treated Under Fluorine: Low-Field and High-Resolution Studies," *J. Solid State Chem.* 118:1262-1268.
Giraudet et al. (2005) "Solis-State NMR ($^{19}$F and $^{13}$C) Study of Graphite Monofluoride $(CF)_n$: 19F Spin;Lattice Magnetic Relaxation and 19F/13C Distance Determination by Hartmann-Hahn Cross Polarization," *J. Phys. Chem. B* 109:175-181.
Gladyshevskii et al. (1964) "New Examples of the Structural Type $Li_{22}Pb_5$," *Sov. Phys. Crystallogr.* 9(3):269-271.
Gokel et al. (2000) "Experimental Evidence for Alkali Metal Cation—π Interactions," *Eur. J. Chem.* :2967-2978.
Graetz et al. (2003) "Highly Reversible Lithium Storage in Nanostructured Silicon," *Electrochemical and Solid-State Letters*, 6(9) A194-A197.
Guerin et al. (2004) "Hybrid-Type Graphite Fluoride as Cathode Material in Promary Lithium Batteries," *Electrochem. Solid-State Lett.* 7(6):A159-A162.
Gupta et al. (2001) "Raman Scattering Study of Highly Fluorinated Graphite," *J. Fluorine Chem.*, 110:145-151.
Gupta et al. (2003) "A Study on the Formation Mechanism of Graphite Fluorides by Raman Spectroscopy," *J. Fluorine Chem.* 120:143-150.
Hafner et al. (1998) "Catalytic Growth of Single-Wall Carbon Nanotubes From Metal Particles," *Chem. Phys. Lett.* 296(1-2): 195-202.
Hagaman et al. (1998) "Solid-State $^{13}$C and $^{19}$F NMR Characterization of Fluorinated Charcoal," *Energy & Fuel* 12:399-408.
Hamwi et al. (1997) "Fluorination of Carbon Nanotubes," *Carbon* 35:723-728.
Hamwi et al. (1998) "Electrochemical Properties of Carbon Nanotube Fluorides in a Lithium Cell System," *Mol. Cryst. Liq. Cryst.* 310:185-190.
Hamwi, A. (1996) "Fluorine Reactivity with graphite and Fullerenes. Fluoride Derivatives and Some Practiccal Electrochemical Applications," *J. Phys. Chem. Solids* 57(6-8):677-688.
Hany et al. (1997) "Low-Temperature Carbon Fluoride for High Power Density Lithium Primary Batteries," *J. Power Sources* 68(2):708-710.
Harris, P. (1999) *Carbon Nanotubes and Related Structures*, Cambridge University Press, Cambridge, pp. 103.
Harutyunyuan et al. (2002) "Purification of Single-Wall Carbon Nanotubes by Selective Microwave Heating of Catalyst Particles," *J. Phys. Chem. B* 106:8671-8675.
Holzinger et al. (2000) "A New Purification Method for Single-Wall Carbon Nanotubes (SWNTs)," *Appl. Phys. A* 70:599-602.
Hopf et al. (1972) "Structure of the Lithium Germanide Phase $Li_7Ge_2$," *Z. Naturforsch. B* 22:1157-1160.
Iijima, S. (1991) "Helical Microtubules of Graphite Carbon," *Nature* 354:56-58.
Iijima et al. (1993) "Single-Shell Carbon Nanotunbes 1-nm Diameter," *Nature* 363:603-605.

(56) References Cited

OTHER PUBLICATIONS

Inagaki et al. (2004) "Exfoliation Process of Graphite Via Intercalation Compounds with Sulfuric Acid," *J. Phys. Chem. Solids* 65:133-137.
Inagaki et al. (1994) "Graphite Exfoliation at Room Temperature and its Structural Annealing," *Carbon* 32(7):1253-1257.
International Search Report Coressponding to International Application No. PCT/US07/62518, Mailed Sep. 27, 2007.
International Search Report Corresponding to International Application No. PCT/US05/37871, Mailed Apr. 19, 2006.
International Search Report Corresponding to International Application No. PCT/US05/08897, Mailed Aug. 28, 2006.
International Search Report corresponding to International Application No. PCT/US/03/28395, Mailed Feb. 8, 2005.
Jacobs (2005) Lithium Battery Basics, Machine Design, www.machinedesign.com/ASP/strArticleID/55501/strSite/MDSite/view Selected Art.asp.
Jacobs (2005) "Long-lasting Lithiums," *Electron. Comm Technol.*, http://dataweek/co.za/Article.ASP?pkIArticleID=1847&pkIIssueID=455.
Johansson, P. (2006) "Intrinsic Anion Oxidation Potentials," *J. Phys. Chem.* 110:12077-12080.
Johnson et al. (1965) "The Crystal Structure of $Li_{15}Ge_4$," *Acta. Cryst.* 18:131-132.
Journet et al. (1997) "Large-Scale Production of Single-Walled Carbon Nanotubes by the Electric-Arc Technique," *Nature* 388:756-758.
Kelly et al. (1999) "Insight into the Mechanicsm of Sidewall Functionalization of Single-Walled Nanotubes: An STM Study," *Chem. Phys. Lett.* 313:445-450.
Kita et al. (1979) "Chemical Composition and Crystal Structure of Graphite Fluoride," *J. Am. Chem. Soc.*, 101:3832-3841.
Kitiyanan et al. (2000) "Controlled Production of Single-Wall Carbon Nanotubes by Catalytic Decomposition of CO on Bimetallic Co—Mo Catalysts," *Chem. Phys. Lett.* 317(3-5):497-503.
Knight et al. (1980) "Characterization of Diamond Films by Ranan Spectroscopy," *J. Mater Res.* 4:385-393.
Kovtyukhova et al. (2003) "Individual Single-Walled Nanotubes and Hydrogels Made by Oxidative Exfoliation of Carbon Nanotube Ropes," *J. Am. Chem. Soc.* 125:9761-9769.
Krawietz et al. (1998) "Characterization of Poly(carbon monofluoride) by 19F and 19F to 13C Cross Polarization MAS NMR Spectroscopy," *Chem. Commun.* 19:2151-2151.
Kuga et al. (1993) "Laser-Assisted Exfoliation of Potassium-Ammonia-Graphite Intercalation Compounds," *Carbon* 31(1):201-204.
Kuriakose et al. (1965) "Kinetics of Reactions of Elemental Fluorine. IV. Fluorination of Graphite," *J. Phys. Chem.* 69:2272-2274.
Lam et al. (Jun. 27, 2005) "Physical Characteristics and Rate Performance $(CF_x)_n$ (0.33<x<0.66) in Lithium Batteries," *J. Power Sci.* 153:354-359.
Lee et al. (2003) "The Physiochemical Characteristics of Modified Carbon Fibers by Fluorination," *Korean J. Chem. Eng.* 20(1):151-156.
Lee et al. (2004) "Synthesis of a Series of Fluorinated Boronate Compounds and Tehir Uses as Additives in Lithium Battery Electrolytes," *J. Electrochem. Soc.* 151(9):A1429-1435.
Lee et al. (Aug. 1998) "The Synthesis of a New Family of Boron-Based Anion Receptors and The Study of Their Effect on Ion Pair Dissociation and Conductivity of Lithium Salts in Nonaqueous Solutions," *J. Electrochem. Soc.* 145(8):2813-2818.
Li et al. (2000) "The Crystal Structural Evolution of Nano-Si Anode Caused by Lithium Insertion and Extraction at Room Temperature," *Solid State Ionics*, 135:181-191.
Li et al. (1999) "A High Capacity Nano-Si Composite Anode Material for Lithium Rechargeable Batteries," *Electrochemical and Solid-State Letters*,2(11) 547-549.
Limthongkul et al. (2003) "Electrochemically-Driven Solid-State Amorphization in Lithium-Silicon Alloys and Implications for Lithium Storage," *Acta Materialia* 51:1103-1113.
Linden et al. (2001) "Lithium Batteries," In; *Handbook of Batteries*, 3$^{rd}$ ed., Ch. 14, New York, McGraw Hill, pp. 14.1-14.99.

Liu et al. (1998) "Fullerene Pipes," *Science* 280:1253-1256.
Liu et al. (2005) "Versatile Self-Complexing Compounds Based on Covalently Linked Donoe-Acceptor Cyclophanes," *Chem. Eur. J.* 11:369-385.
Magasinski et al. (2002) "Graphitization, Intercalation, and Exfoliation of Cokes and Anthracites: A Comparative Study," *Fuel Processing Technol.* 79(3):259-264.
Mark et al. (1986) "Electron-Transfer Polymers," In; *Encyclopedia of Polymer Science and Engineering*, 2$^{nd}$ ed., vol. 5, Wiley, pp. 725-755.
Menges et al. (1969) "Crystal Structure of Lithium Germanide, A New Type of Three-Dimensional Bonding of Element(IV) Atoms," *Z. Naturforsch. B* 24:1351-1352.
Messaoudi et al. (1991) "Chemical-Reduction of $FeCl_3$-Graphite Intercalation Compounds with Potassium Naphalene Complex in Tetrahydrofuran," *J. Mater. Chem.* 1(5):735-738.
Mickelson et al. (1998) "Fluorination of Single-Wall Carbon Nanotubes," *Chem. Phys. Lett.* 296:188-194.
Mitkin et al. (2002) "X-ray Electron- and Auger-Spectroscopic Study of Superstoichiometric Fluorographite-Like Materials," *J. Struct. Chem.*, 43:843-855.
Mittkin et al. (2003) "Types of Inorganic Fluorocarbon Polymer Materials and Structure-Property Correlation Problems," *J. Struct. Chem.*, 44:82-115 (Translated from *Zhurnal Structunoi Khimii* 44:99-138).
Mochida et al. (2000) "Chemistry of Synthesis, Structure, Preparation and Application of Aromatic-Derived Mesophase Pitch," *Carbon* 38:305-328.
Morita et al. (1980) "Evaluation of Cathode Materials for the Lithium/Carbonmonofluride Battery," *J. Power Sources* 5:111-125.
Nakajima et al. (1999) "Electrochemical Behavior of Surface-Fluorinated Graphite," Electrochem. Acta, 44:2879-2888.
Nakajima et al. (1991) "Synthesis and Structures of Graphite Fluorides," In; *Graphite Fluorides and Carbon-Fluorine Compound*, CRC Press, Boca Raton, FL, Ch. 2, pp. 11-41.
Nakajima et al. (1991) "Lithium-Graphite Fluoride Battery," In; *Graphite Fluorides and Carbon-Fluorine Compounds*, CRC Press, Boca Raton, FL, Ch. 4, pp. 77-109.
Nakajima, T. (1995) "Synthesis, Structure, and Physicochemical Properties of Fluorine-Graphite Intercalation Compounds," In; *Fluorine-Carbon and Fluoride-Carbon Materials*, Marcel Dekker, New York, pp. 1-31.
Nakamizo et al. (1974) "Laser Raman Studies on Carbons," *Carbon* 12:259-267.
Nanse et al. (1997) "Fluorination of Carbon Blacks: An X-Ray Photoelectron Spectroscopy Study: I. A literature Review of XPS Studies of Fluorinated Carbons. XPS investigation of some reference compounds," *Carbon*, 35:175-194.
Nasimbulin eet al. (2005) "Synthesis of Nanoparticles Using Vapor-Phase Decomposition of Copper(II) Acetylacetonate," *Colloid J.* 67(1):1-20.
Nazri, M. (2004) "Liquid Electrolytes: Some Theoretical and Practical Aspects," In; *Lithium Batteries Science and Technology*, Ch. 17, Kluer Academic Publisherss, pp. 509-573.
Nemanich et al. (1977) "Raman Scattering from Intercalated Donor Compounds of Graphite," *Phys. Rev. B* 16(6):2965-2972.
Nesper (1990) "Structure and Chemical Bonding in Zintl-Phases Containing Lithium," *Prog. Solid-State Chem.* 20:1-45.
Oberlin et al. (1989) "High-Resolution TEM Studies of Carbonization and Graphitization," *Chemistry and Physics of Carbon*, Thrower, P.A. ed., vol. 22, New York, Marcel Dekker, pp. 1-143.
Ohara et al. (2003) "Li Insertion/Extraction Reaction at a Si Film Evaporated on a Ni Foil," *Journal of Power Sources*, 119-121.
Okotrub et al. (2000) "Fluorinated Cage Multiwall Carbon Nanoparticles," *Chem. Phys. Lett.* 323:231-236.
Osswald et al. (2005) "Elimination of D-Band in Raman Spectra of Double-Wall Carbon Nanotubes by Oxidation," *Chem. Phys. Lett.* 402:422-427.
Panich A.M. (1999) "Nuclear Magnetic Resonance Study of Fluorine-Graphite Intercalation Compounds and Graphite Fluorides," *Synth. Matals* 100:169-185.
Panich et al. (2001) "On Paramagnetism in Fluorinated Graphite: EPR and Solid-State NMR Study," *J. Phys. Chem. Solids* 62:959-964.

(56) References Cited

OTHER PUBLICATIONS

Pelikan et al. (2003) "On the Structural and Electronic Properties of Poly(dicarbon monofluoride): Solid-State Semi-Empirical INDO Study," *J. Solid State Chem.*, 174:233-240.

Petitjean et al. (1994) "Exothermic Exfoliation of Graphite-Intercalation Compounds Containing Perchloric-Acid," *Carbon* 32(3):461-467.

Pilarzyk "Lithium Carbon Monofluoride Coin Cells in Real-Time Clock and Memory Backup Applications," *Rayovac, White Papers*, http://www.rayovac.com/technical/wp_lithium.htm.m Downloaded Oct. 17, 2005.

Piotrowski et al. (2001) "Self-Assembled Organometallic [12]Metallacrown-3 Complexes," *Chem. Eur. J.* 7(15):3197-3207.

Press et al. (1988) *Numerical Recipes in C, The Art of Scientific Computing*, Plenum Press, New York.

Rao et al. (1992) "Raman-Scattering and Transmission-Electron-Microscopy Studies of Fluorine-Intercalated Graphite Fibers $C_xF$ ($7.8 \geq x \geq 2.9$)," *Phys. Rev. B* 45:6883-6892.

Rinzler et al. (1998) "Large-Scale Purification of Single-Wall Carbon Nanotubes: Process, Product, and Characterization," *Appl. Phys. A* 67:29-37.

Rudorf et al. (1947) "Zur Konstitution des Kohlenstoff-Monofluorides," *Z. Anorg. Allg. Chem.* 253:281-296.

Ruff et al. (1934) "Die Reaktionsprodukte der verschiedenen Kohlenstoffformen mit Fluor II (Kohlenstoff-monofluoride)," *Z. Anorg. Allg. Chem.* 217:1-18.

Sano et al. (2002) "Properties of Carbon Onions Produced by an Arc Discharge in Water," *J. Appl. Phys.* 92(5):2783-2788.

Sato et al. (2004) "On the So-Called 'Semi-Ionic' C-F Bond Character in Fluorine-GIC," *Carbon* 42:3243-3249.

Sayama et al. (2002) "New Active Material Structure in Si Thin Film Electrode for Rechargable Lithium Batteries," The 11th International Meeting on Lithium Batteries, Abstract 52, Monterey, CA, Jun. 23-28, 2002.

Seel et al. (2000) "Electrochemical Intercalation of $PF_6$ into Graphite," *J. Electrochem. Soc.* 147(3):892-898.

Shneyder "Two-Dimensional Oxidation of SiGe," 69-71, http://www.nnf.cornell.edu/1999REU/ra/Schneyder.pdf.

Shundrin et al. (2004) "The Electrochemical Oxidation of Polyfluorophenyltrifluoroborate Anions in Acetonitrile," *Z. Anorg. Allg. Chem.* 630:1253-1257.

Singh et al. (2006) "Study of Interactions of Various Ionic Species with Solvents Toward the Design of Receptors," *Theor. Chem. Acc.* 115:127-135.

Skowronski et al. (2004) "Electrochemical Intercalation of $ZnCl_2$-$CrO_3$-GIC (Graphite Intercalation Compound) with Sulfuric Acid," *Polish J. Chem.* 78:1339-1344.

Steed, J.W. (2001) "First- and Second Sphere Coordination Chemistry of Alkali Metal Crown Ether Complexes," *Coord. Chem. Rev.* 215:171-221.

Stein et al. (1987) "Π-Electron Properties of Large Condensed Polyaromatic Hydrocarbons," *J. Am. Chem. Soc.* 109:3721-3729.

Su et al. (2000) "A Scalable CVD Method for the Synthesis of Single-Walled Carbon Nanotubes with High Catalyst Productivity," *Chem. Phys. Lett.* 322(5):321-326.

Sun et al. (2003) "The Compatibility of a Boron-Based Anion Receptor with the Carbon Anode in Lithium-Ion Bateries," *Electorchem. Solid-State Lett.* 6(2):A43-A46.

Sun et al. (1998) "A Novel Lithium Battery Electrolyte Based on Lithium Fluoride and a Tris(pentafluorophenyl) Borane Anion Receptor in DME," *Electrochem. Solid-State Lett.* 1(6):239-240.

Takai et al. (2000) "Fluorine-Introduced sp3-Carbon Sites in a Nano-Sized pi-Electron System and Their Effects on the Electronic Properties," *Mol. Cryst. Liq. Cryst.* 340:289-294.

Takamura et al. (2002) "Li Insertion/Extraction Reaction of a Si Film Evaporated on Ni Foil," The 11th International Meeting on Lithium Batteries, Abstract 257, Monterey, CA, Jun. 23-28, 2002.

Takenobu et al. (2003) "Hydrogen Storage in $C_{70}$ Encapsulated Single-Walled Carbon Nanotube," *Synthetic Metals* 135-136:787-788.

Thess et al. (1996) "Crystalline Ropes of Metallic Carbon Nanotubes," *Science* 273:483-487.

Touhara et al. (1987) "On the Structure of Graphite Fluoride," *Anorg. All. Chem.*, 544:7-20.

Touhara et al. (2000) "Property Control of Carbon Materials by Fluorination," *Carbon* 38:241-267.

Touhara et al. (2002) "Property Control of New Forms of Carbon Materials by Fluorination," *J. Fluorine Chem.* 114:181-188.

Touhara et al. (1987) "Electrochemical Characteristics of Fluorine Intercalated Graphite Fiber-Lithium Cells," *Electrochemica Acta* 32(2):293-298.

Touhara et al. (2004) "Fluorination of Cup-Stacked Carbon Nanotubes, Structure and Properties," Materials Research Society Fall Meeting Proceedings, MRS Proceedings vol. 858E, Abstract No. HH12.3.

Toyoda et al. (2004) "Exfoliation of Carbon Fibers," *J. Phys. Chem. Solids* 65:109-117.

Tuinstra et al. (1970) "Raman Spectrum of Graphite," *J. Chem. Phys.* 53(3):1126-1130.

Ue et al. (2002) "Anodic Stability of Several Anions Examined by AB Initio Molecular Orbital and Density Functional Theories," *J. Electrochem. Soc.* 149(12):A1572-A1577.

Ue et al. (2006) "Electrochemical Properties of $Li[C_nF_{2n+1}BF_3]$ as Electrolyte Salts for Lithium-Ion Cells," *Solid State Ionics* 177:323-331.

Watanabe et al. (1988) "Graphite Intercalation Compound of Fluorine," In; *Graphite Fluorides*, Elsevier, Amsterdam, Ch. 8, pp. 240-261.

Wantanabe et al. (1988) "Lithium-Graphite Fluoride Battery," In; *Graphite Fluorides*, Elsevier, Amsterdam, Ch. 5, pp. 148-203.

Wantanabe et al. (1988) "Preparation, Stoichiometry and Structure of Graphite Fluoride," In; *Graphite Fluorides*, Elsevier, Amsterdam, Ch. 2, pp. 23-89.

Watanabe, N. (1981) "Characteristics and Applications of Graphite Fluoride," *Physica B* 105:17-21.

Whitacre et al. (Sep. 2006) "Low Operational Temperature Li-CFx Batteries Using Cathodes Containing Sub'Fluorinated GraphiteMaterials," *J. Power Sources* 160:577-584.

Whittingham (1975) "Mechanism of Reduction of Fluorographite Cathode," *J. Electrochem. Soc.*, 122:526-527.

Wilkie et al. (1979) "The Solid-State $^{13}$C-NMR and $^{19}$F-NMR Spectra of Some Graphite Fluorides," *J. Solid State Chem.* 30:197-201.

Winter et al. (2004) "Carbonaceous and Graphitic Anodes," In; *Lithium Batteries Science and Technology*, Ch. 5, Kluer Academic Publisherss, pp. 144-194.

Woo et al. (2003) "Structural Characteristics of Carbon Nanorods and Nanotubes Grown Using Electron Cyclotron Resonance Chemical Vapor Deposition," *J. Appl. Phys.* 94(10):6789-6795.

Xu et al. (2004) "Nonaqueous Liquid Electrolytes for Lithium-Based Rechanrgeable Batteries," *Chem. Rev.* 104:4303-4417.

Yang et al. (2002) "Characteristics and Carbonization Behaviors of Coal Extracts," *Fuel Processing Technol.* 70:207-215.

Yazami et al. (2006) "The Kinetics of Sub-Fluorinated Carbon Fluoride Cathods for Lithium Battereis," Meeting Abstracts, Electrochem Soc., 210th ECS Meeting, Oct. 29-Nov. 3, Cancun Mexico Abstract #235.

Yokomichi et al. (2000) "Temperature Dependence of Electron Spin Resonance in Fluorinated Amorphous Carbon Films," *J. Non-Cryst. Solids* 266:797-802.

Yokomichi et al. (1998) "Preparation of Fluorinated Amorphous Carbon Thin Films," *J. Non-Cryst. Solids* 227:641-644.

Yoshida et al. (1991) "Exfoliated Graphite from Various Intercalation Compounds," *Carbon* 29(8):1227-1231.

Zajac et al. (2000) "The Structure and Properties of Graphite Monofluoride Using the Three-Dimensional Cyclic Cluster Approach," *J. Solid State Chem.*, 150:286-293.

Zhao et al. (2005) "A Calixarene-Amide-tetrathiafulvalene Assembly for the Electrochemical Detection of Anions," *New J. Chem.* 29:1164-1167.

Zheng et al. (2002) "CVD Synthesis and Purification of Single-Walled Carbon Nanotubes on Aerogel-Supported Catalyst," *Appl. Phys. A* 74:345-348.

(56) References Cited

OTHER PUBLICATIONS

Zhou et al. (2005) "Li[$C_2F_5BF_3$] as an Electrolyte Salt for 4 V Class Lithium-Ion Cells," *J. Electrochem. Soc.* 152(2):A351-A356.

Zhou et al. (1999) "Controlled Li Doping of Si Nanowires by Electrochemical Insertion Method," *Applied Physics Letters*, 75(16):2447-2449.

Author (Unknown), 2004, "Meeting the Energy Need of Future Warriors," *National Academic Press*, www.nap.edu/openbook/0309092612/html/91.html, Downloaded Oct. 14, 2005.

Author (Unknown), 2004, "Meeting the Energy Need of Future Warriors," *National Academic Press*, www.nap.edu/openbook/0309092612/html/88.html, Downloaded Oct. 14, 2005.

Author (Unknown), "Lithium Batteries," Panasonic Ideas for Life, Product brochure, www.panasonic.com/industrial/battery/oem/chem/lith/index.html, Downloaded Oct. 14, 2005.

Author (Unknown), 2000-2005, PowerStream Battery Chemistry FAQ, PowerStream Technology, www.powerstream.com/BatteryFAQ.html, Last Updated Aug. 17, 2003.

English translation of Office Action issued May 11, 2010 by the State Intellectual Property Office of the People's Republic of China, corresponding to Patent Application No. 200780037985.3, national stage of PCT/US2007/075697.

Supplementary European Search Report, Corresponding to European Application No. EP07873790, Mailed Jan. 30, 2012.

Lee et al. (2000) "Synthesis of Cyclic Aza-Ether Compounds and Studies of Their Use as Anion Receptors in Nonaqueous Lithium Halide Salts Solution," *J. Electrochemical Soc.* 147:1 pp. 9-14.

Sun et al. (2002) "A New Additive for Lithium Battery Electrolytes Based on an Alkyl Borate Compound," *J. Electrochemical Soc.* 149:3 pp. A355-A359.

Sun et al. (1999) "Comparative Studies of the Electrochemical and Thermal Stability of Two Types of Composite Lithium Battery Electrolytes Using Boron-Based Anion Receptors," *J. Electrochemical Soc.* 146:10 pp. 3655-3659.

\* cited by examiner

With LiF

DISSOCIATING AGENTS, FORMULATIONS AND METHODS PROVIDING ENHANCED SOLUBILITY OF FLUORIDES

CROSS-REFERENCE TO RELATED APPLICATIONS

This application claims the benefit under 35 USC §119 of U.S. Patent Application No. 60/837,174, filed Aug. 11, 2006, this application is also a continuation-in-part of U.S. application Ser. No. 11/681,493 filed Mar. 2, 2007, both of which are incorporated herein by reference in their entireties to the extent not inconsistent with the present description.

STATEMENT REGARDING FEDERALLY SPONSORED RESEARCH OR DEVELOPMENT

Not applicable.

BACKGROUND OF INVENTION

Advances in electrochemical storage and conversion devices have significantly expanded the capabilities of these systems in a variety of fields including portable electronics, aerospace technologies, communications and biomedical instrumentation. State of the art electrochemical storage and conversion devices are specifically engineered to have designs and performance attributes supporting specific target application requirements and operating environments. Such advanced electrochemical storage systems include high energy density batteries exhibiting low self discharge rates and high discharge reliability for implanted medical devices; inexpensive light weight rechargeable batteries for portable electronics, and high capacity batteries capable of providing high discharge rates over short time intervals for military and aerospace applications.

Widespread implementation of this diverse suite of advanced electrochemical storage and conversion systems continues to motivate research directed to expanding the functionality of these systems to enable the next generation of high performance device applications. Growth in the demand for high power portable electronic products, for example, has created enormous interest in developing safe, light weight primary and secondary batteries with higher energy densities. The demand for miniaturization in the field of consumer electronics and instrumentation also continues to stimulate research into novel design strategies for reducing the sizes, masses and form factors of high performance batteries. Further, developments in the fields of electric vehicles and aerospace engineering has also created a significant need for highly reliable batteries exhibiting high energy densities and high power densities for a range of useful operating environments.

Many advances in electrochemical storage and conversion technology are directly attributable to discovery and integration of new materials for battery components. Lithium battery technology, for example, continues to rapidly develop, at least in part, due to the discovery of novel electrode and electrolyte materials for these systems. From the pioneering identification of intercalation host materials for positive and negative electrodes to the development of high performance non-aqueous electrolytes, the discovery and optimization of novel materials for lithium battery systems have revolutionized their design and performance capabilities. As a result of these advances, lithium based battery technology is currently preferred for certain commercially significant applications including primary and secondary electrochemical cells for portable electronic systems.

Advances in materials strategies and cell designs for lithium battery technology have realized primary and secondary electrochemical cells capable of providing useful device performance including: (i) large energy densities (e.g., ≈150 Wh kg$^{-1}$), (ii) high cell voltages (e.g. up to about 3.6 V), (iii) substantially constant (e.g., flat) discharge profiles, (iv) long shelf-life (e.g., up to 10 years), (v) good cycling characteristics, and (vi) compatibility with a range of operating temperatures (e.g., −20 to 60 degrees Celsius). As a result of these beneficial characteristics, primary and secondary lithium batteries are widely employed as power sources for many portable electronic devices, such as cellular telephones and portable computers, and for other important device applications in the fields of biomedical engineering, sensing, military communications, and lighting.

Primary lithium battery systems typically utilize a lithium metal negative electrode for generating lithium ions. During discharge, lithium ions are transported from the negative electrode through a liquid phase or solid phase electrolyte and undergo intercalation reaction at a positive electrode comprising an intercalation host material. Dual intercalation lithium ion secondary batteries have also been developed, wherein lithium metal is replaced with a second lithium ion intercalation host material providing the negative electrode. In lithium ion secondary cells, simultaneous lithium ion insertion and de-insertion reactions allow lithium ions to migrate between the positive and negative intercalation electrodes during discharge and charging cycles. Incorporation of a lithium ion intercalation host material for the negative electrode has the significant advantage of avoiding the use of metallic lithium which is susceptible to safety problems upon recharging attributable to the highly reactive nature and non-epitaxial deposition properties of lithium. Useful intercalation host materials for electrodes in lithium cells include carbonaceous materials (e.g., graphite, cokes, subfluorinated carbons etc.), metal oxides, metal sulfides, metal nitrides, metal selenides and metal phosphides. U.S. Pat. Nos. 6,852, 446, 6,306,540, 6,489,055, and "Lithium Batteries Science and Technology" edited by Gholam-Abbas Nazri and Gianfranceo Pistoia, Kluer Academic Publishers, 2004, are directed to lithium and lithium ion battery systems which are hereby incorporated by reference in their entireties.

Electrolytes for lithium electrochemical cells are limited to nonaqueous materials given the extremely reactive nature of lithium with water. Several classes of nonaqueous electrolytes have been successfully implemented for lithium electrochemical cells including: (i) solutions of lithium salts dissolved in organic or inorganic solvents, (ii) ionically conducting polymers, (iii) ionic liquids and (iv) fused lithium salts. Nonaqueous electrolyte solutions comprising lithium salts dissolved in polar organic solvents are currently the most widely adopted electrolytes for primary and secondary lithium cells. Useful solvents for these electrolytes include polar solvents that facilitate dissociation of lithium salts into their ionic components. Polar solvents exhibiting useful properties for lithium cell electrolytes include linear and cyclic esters (e.g., methyl formate, ethylene carbonate, dimethyl carbonate and propylene carbonate), linear and cyclic ethers (e.g., dimethoxiethane, and dioxolane) acetonitrile, and γ-butyrolactone. Lithium salts in these electrolyte systems are typically salts comprising lithium and complex anions that have relatively low lattice energies so as to facilitate their dissociation in polar organic solvents. Lithium salts that have been successfully incorporated in electrolytes for these systems include $LiClO_4$, $LiBF_4$, $LiAsF_6$, $LiSbF_6$, $LiAlCl_4$ and $LiPF_6$ provided at concentrations ranging from 0.01 M to 1M.

Successful implementation of polar organic solvent based electrolyte systems for primary or secondary lithium batteries involves a number of considerations involving their chemical and physical properties. First, the electrolyte must be capable of forming a stable passivation layer on the surfaces of the electrode that does not result in a significant voltage delay at the onset of discharge and is capable of rapid reformation upon high current discharge. Second, the electrolyte must be chemically stable with respect to electrolytic degradation for relevant electrode material and discharge conditions. Third, the electrolyte must exhibit a useful ionic conductivity. State of the art electrolytes for these systems, for example, exhibit ionic conductivities at 25 degrees Celsius greater than or equal to about 0.005 S cm$^{-1}$. Other physical properties of electrolytes useful for providing enhanced performance in electrochemical cells include thermal stability, low viscosity, low melting point, and high boiling point.

The power output of many state of the art lithium cells is currently limited by the conductivity of electrolytes which determines, in part, the internal resistance of these systems. Accordingly, substantial research is currently directed toward developing electrolytes for primary and secondary lithium cells providing large ionic conductivities for accessing higher device performance. A number of strategies have been developed for increasing the ionic conductivities of polar organic solvent based electrolyte systems for primary or secondary lithium batteries. Many of these strategies involve providing additives to the electrolyte to enhance dissolution of a lithium salt while at the same time maintaining chemical and electrochemical stability under discharge and charging conditions.

Anion receptors are a class of compounds that have been recently developed as additives to increase the ionic conductivity of nonaqueous electrolyte solutions (See, e.g., U.S. Pat. Nos. 6,022,643, 6,120,941, and 6,352,798). Anion receptors enhance the ionic disassociation of lithium salts in low dielectric solvents by incorporating non-hydrogen bonded electrophilic groups that participate in complex formation reactions with anions of the lithium salt provided to the electrolyte. Some anion receptor additives have been demonstrated to enhance the dissolution of specific lithium salts in a manner resulting in an increase in solubility by several orders of magnitude. Anion receptor additives encompass a wide range of compounds including fluorinated boron-based anion receptors, such as boranes, boronates and borates having electron withdrawing ligands, polyammonium compounds, guanidiniums, calixarene compounds, and aza-ether compounds. Successful integration of anion receptors in lithium batteries, however, depends on a number of key factors. First, the anion receptor must be stable with respect to electrolyte decomposition under useful discharge and charging conditions. Second, anion receptors should be capable of releasing (or de-complexing) complexed anions so as not to hinder intercalation reactions at the electrodes. Third, the anion receptor itself preferably should not participate in intercalation with the intercalation host material, and if it does participate in such intercalation reactions it should not result in mechanically induced degradation of the electrodes.

Additives have also been developed to impart other useful chemical and physical characteristics to polar organic solvent based electrolytes for lithium cells. U.S. Pat. No. 6,306,540 (Hiroi et al.), for example, provides additives for improving the stability of nonaqueous electrolytes by minimizing gas formation decomposition reactions involving lithium salts and their dissociation products. This reference discloses electrolyte compositions having a LiF additive provided to a solution of $LiPF_6$ in a nonaqueous organic solvent. At least partial dissolution of the LiF additive generates fluoride ions in the nonaqueous electrolyte which is reported to suppress gas forming decomposition reactions involving $PF_6^-$ anions. The reference notes, however, that very little fluoride ion is generated in the electrolyte due to the inherently low solubility of LiF in the nonaqueous organic solvents evaluated. The reference reports, for example, that due to the poor solubility of LiF in the electrolytic solution it was difficult to dissolve 0.2% by weight of LiF (~0.077 M) at room temperature.

As will be clear from the foregoing, there exists a need in the art for nonaqueous electrolytes exhibiting chemical and physical properties useful for electrochemical conversion and storage systems. Nonaqueous electrolytes are needed that exhibit large ionic conductivities and good stability for use in primary and secondary lithium electrochemical cells. Specifically, a need exists for additives for enhancing the solubility and stability of lithium salts in nonaqueous electrolytes for primary and secondary lithium electrochemical cells.

Further, there exists generally a need in the art for methods providing for enhanced solubility and/or dissolution of fluorides, including inorganic fluorides that typically exhibit very low solubilities in many solvent environments. Processes and compositions providing enhanced solubility of fluorides are needed to allow new chemistries to take place in the solution phase, including aqueous and nonaqueous phases. A broad range of potential applications exists for methods and compositions for enhancing the solubility of fluorides including surface fluorination, and organic and inorganic fluorination using soft chemistry methods. One example of a class of such reactions involves surface fluorination for the purpose of enhancing corrosion resistance. Sources of solution phase fluoride ions are particularly needed that do involve the use of, or formation of, highly corrosive HF in solution and/or gas phases.

Table 1 provides a summary of solubility data for a range of inorganic fluorides in water. As shown in Table 1, many solid state inorganic fluorides ($MF_n$), for example $CdF_2$, $CoF_2$, $FeF_3$, $MnF_2$, $NaF$, $NiF_2$, $ZnF_2$, $ZrF_4$, $AlF_3$, $BaF_2$, $CaF_2$, $CuF_2$, $FeF_2$, $InF_3$, $LiF$, $MgF_2$, $PbF_2$, $SrF_2$, $UF_4$, $VF_3$-$3H_2O$, $BiF_3$, $CeF_3$, $CrF_2/CrF_3$, $GaF_3$, $LaF_3$, $NdF_3$, and $ThF_4$, are poorly soluble in water and many organic solvents. Other fluorides, such as $CsF$, $RbF$, $KF$, $SbF_3$ and $AgF$, readily dissolve into water at the ambient temperatures. When hydrolysis is not a problem, insoluble element fluorides can be prepared as water precipitates by halide metathesis or by the reaction of aqueous hydrofluoric acid with the appropriate element oxide, hydroxide, carbonate or with the element itself. As discussed above, however, the use of hydrofluoric acid has significant drawbacks given its highly corrosive and toxic nature.

Accordingly, the dissolution of insoluble fluorides is currently a great challenge in chemical science and technology. Among other advantages, it can provide fluorine rich solutions for new chemical synthesis through solution reactions or for appropriate physical properties of dissolved fluorinated species. Specifically, methods and compositions providing enhanced solubility of fluorides may provide an important tool for accessing solution phase fluoride compositions useful for solution phase and surface phase synthetic pathways. As discussed above, methods and compositions providing enhanced solubility of fluorides would also enable new electrolyte solutions for many applications, including electrosynthesis, electrodeposition, and electropassivation, and in electrochemical energy storage and conversion systems such as primary and secondary batteries, electrochemical double-layer capacitors and fuel cells.

TABLE 1

Summary Of Solubility Data For A Range Of Inorganic Fluorides

| Fluoride solubility | Fluoride | Solubility in Water (g/100 ml) | Solubility in Water (mol/L) |
|---|---|---|---|
| VVS (Very Very Soluble) | AgF | 172 | 13.5 |
| VVS | CsF | 573 | 37.7 |
| VVS | HF | N/A | N/A |
| VVS | RbF | 300 | 28.8 |
| VVS | SbF3 | 492 | 27.5 |
| VVS | TlF | 245 | 11.0 |
| VS (Very Soluble) | BeF2 | N/A | N/A |
| VS | KF | 102 | 17.6 |
| VS | NH4F | 83.5 | 22.6 |
| VS | SnF2 | N/A | N/A |
| VS | TaF5 | N/A | N/A |
| VS | VF4 | N/A | N/A |
| LS (Low Soluble) | CdF2 | 4.36 | 0.29 |
| LS | CoF2 | 1.4 | 0.14 |
| LS | FeF3 | 5.92 | 0.52 |
| LS | MnF2 | 1.02 | 0.11 |
| LS | NaF | 4.13 | 0.98 |
| LS | NiF2 | 2.56 | 0.26 |
| LS | ZnF2 | 1.55 | 0.15 |
| LS | ZrF4 | 1.5 | 0.09 |
| VLS (Very Low Soluble) | AlF3 | 0.5 | 0.0595 |
| VLS | BaF2 | 0.161 | 0.0092 |
| VLS | CaF2 | 0.0016 | 0.0002 |
| VLS | CuF2 | 0.075 | 0.0074 |
| VLS | FeF2 | N/A | N/A |
| VLS | InF3 | 0.04 | 0.0023 |
| VLS | LiF | 0.134 | 0.0515 |
| VLS | MgF2 | 0.013 | 0.0021 |
| VLS | PbF2 | 0.067 | 0.0027 |
| VLS | SrF2 | 0.021 | 0.0017 |
| VLS | UF4 | 0.01 | 0.0003 |
| VLS | VF3—3H2O | N/A | N/A |
| IS (Insoluble) | BiF3 | | |
| IS | CeF3 | | |
| IS | CrF2/CrF3 | | |
| IS | GaF3 | | |
| IS | LaF3 | | |
| IS | NdF3 | | |
| IS | ThF4 | | |
| d (Decomposed) | BF3 | | |
| d | B4F, BrF3, BrF5 | | |
| d | CoF3 | | |
| d | GeF2/GeF4 | | |
| d | Hg2F2/HgF2 | | |
| d | NbF5 | | |
| d | OsF6 | | |
| d | PF3/PF5 | | |
| d | RhF3 | | |
| d | SF4/SF6 | | |
| d | SnF4 | | |
| d | TeF4 | | |
| d | UF6 | | |
| d | VF5 | | |
| d | WF6 | | |

SUMMARY OF THE INVENTION

The present invention provides compositions, formulations and methods providing for the effective dissolution of inorganic fluorides (i.e., an inorganic salt containing one or more fluoride groups) in solvents via incorporation of a dissociating agent component. Dissociating agents of the present invention participate in chemical reactions in solution, such as complex formation, acid-base reactions and adduct formation reactions, that result in enhancement in the dissolution of inorganic fluorides in a range of solvent environments. Dissociating agents comprising Lewis acids, Lewis bases, anion receptors, cation receptors or combinations thereof are provided that significantly increase the extent of dissolution of a range of inorganic fluorides, particularly inorganic fluorides, such as LiF, that are highly insoluble in many solvents in the absence of the dissociating agents of present invention. The compositions, formulations and methods of the present invention are versatile and, thus, are useful for making solutions containing dissolved inorganic fluorides, including aqueous solutions, nonaqueous organic solutions and nonaqueous inorganic solutions. Dissociating agents, formulations and methods of the present invention are useful for producing fluoride ion rich solutions having selected chemical, electronic and physical properties. For example, the present invention provides compositions useful for providing solution phase reagents for chemical synthesis applications. Further, the present invention provides compositions useful for in electrochemical conversion and storage systems, electrosynthesis, electrodeposition (electroplating), electropassivation, electro-etching, and electrochemical detection and analysis, such as enhanced F$^-$ ions sensors and specific electrodes applications. The methods and compositions of the present are also useful for sensing systems, including electrochemical sensing systems such as fluoride ion specific electrodes.

The present invention also provides a new class of nonaqueous electrolytes for electrochemical devices, particularly for primary and secondary lithium electrochemical cells. Electrolyte formulations of this embodiment provide for effective dissolution of lithium salts having inherently low solubilities in many nonaqueous organic solvents. This aspect of the present invention provides electrolyte compositions having chemical and physical properties, such as high ionic conductivities, good chemical and electrochemical stability and useful fluoride ion containing solution phase compositions, that are otherwise inaccessible in these systems. Dissociating agents comprising Lewis acids, Lewis bases, anion receptors, cation receptors or combinations thereof are provided in electrolyte formulations of the present invention that significantly increase the extent of dissolution and solubility of lithium salts, such as LiF, in polar nonaqueous organic solvents such as polar carbonates and γ-butyrolactone. The present nonaqueous electrolyte compositions and dissociating agents are chemically stable in contact with metallic lithium and also exhibit high voltage stabilities over a useful range of discharge and charging potentials. Nonaqueous electrolytes of the present invention enable primary and secondary electrochemical cells, including primary and secondary lithium batteries, exhibiting advanced performance characteristics relative to conventional systems, including large discharge rates and power output capabilities.

In an aspect, the present invention provides a solution having a dissociating agent for enhancing dissolution of one or more inorganic fluorides provided to a solvent or combination of solvents. A solution of this aspect of the present invention is a multi-component formulation comprising: (i) one or more solvents; (ii) a dissociating agent provided to the one or more solvents; and (iii) one or more inorganic fluorides dissolved in the one or more solvents having the dissociating agent. Useful dissociating agents in this aspect of the present invention include Lewis acids, Lewis bases, anion receptors, cation receptors and combinations of these. This aspect of the present invention further provides methods of dissolving an inorganic fluoride in a solvent or combination of solvents comprising the steps of providing a dissociating agent to the solvent(s) and dissolving the inorganic fluoride into the solvent(s) containing the dissociating agent.

Incorporation of a dissociating agent component in solutions of this aspect of the present invention increases the extent of dissolution of the inorganic fluoride in the solvent(s) by participating in chemical reactions in solution, including complex formation, acid-base reactions and adduct formation reactions, that affect the solubility equilibrium conditions in a manner to provide for dissolution of inorganic fluoride(s). In an embodiment, for example, the dissociating agent and inorganic fluoride are provided in amounts sufficient to generate a concentration of inorganic fluoride dissolved in the one or more solvents greater than or equal to 0.15 M. For some applications, the dissociating agent and inorganic fluoride are provided in amounts sufficient to generate a concentration of the inorganic fluoride dissolved in the one or more solvents selected over the range of 0.15 M to 3M, and preferably for particular applications selected over the range of 0.5 M to 1 M. Dissociating agents preferred for some applications exhibit a significant enhancement of the dissolution of the inorganic fluoride on a mole-to-mole basis. In an embodiment, for example, the molar ratio of inorganic fluoride dissolved in the one or more solvents to dissociating agent dissolved in the one or more solvents:

$$\text{Molar Ratio} = \frac{[\text{Inorganic Fluoride}]_{dissolved}}{[\text{Dissociating Agent}]_{dissolved}}$$

is greater than or equal to 0.1, and preferably for some applications selected over the range of 0.1 to 10.

The present formulations, dissociating agents and methods are applicable to a broad range of inorganic fluorides, particularly those exhibiting low solubilities in pure solvent or solvent combinations. Classes of inorganic fluorides useful in the present solutions, formulations and methods include alkali metal fluorides, alkaline earth metal fluorides, transition metal fluorides and ammonium fluorides. The present invention provides solutions of dissolved fluorides having the formula:

$$MF_n \quad (F1)$$

or $$BF_y; \quad (F2)$$

wherein M is a metal selected from the group consisting of Li, Na, K, Rb, Cs, Be, Mg, Ca, Sr, Ba, Sn Pb, and Sb, and n is the oxidation state of M; and wherein B is a polyatomic cation selected from the group consisting of $NH_4^+$ (i.e., ammonium ion) and $N(R_1R_2R_3R_4)^+$ (quaternary ammonium), wherein $R_1$, $R_2$, $R_3$, and $R_4$ are each selected independently from the group consisting of a H atom, an alkyl group, an acetyl group and an aromatic (phenyl) group, and wherein y is the charge state of B. In an embodiment, for example, a solution of the present invention comprises an inorganic fluoride component selected from the group consisting of $CdF_2$, $CoF_2$, $FeF_3$, $MnF_2$, NaF, NiF2, $ZnF_2$, $ZrF_4$, $AlF_3$, $BaF_2$, $CaF_2$, $CuF_2$, $FeF_2$, $InF_3$, LiF, $MgF_2$, $PbF_2$, $SrF_2$, $UF_4$, $VF_3$-$3H_2O$, $BiF_3$, $CeF_3$, $CrF_2/CrF_3$, $GaF_3$, $LaF_3$, $NdF_3$, $ThF_4$, AgF, CsF, RbF, $SbF_3$, TlF, $BeF_2$, KF, $NH_4F$, $SnF_2$, $TaF_5$, $VF_4$, $BF_3$, BrF, $BrF_3$, $BrF_5$, $CoF_3$, $GeF_2/GeF_4$, $Hg_2F_2/HgF_2$, $NbF_5$, $OsF_6$, $PF_3/PF_5$, $RhF_3$, $SF_4/SF_6$, $SnF_4$, $TeF_4$, $UF_6$, $VF_5$, and $WF_6$. In an embodiment, for example, a solution of the present invention comprises an inorganic fluoride component selected from the group consisting of: $CdF_2$, $CoF_2$, $FeF_3$, $MnF_2$, NaF, $NiF_2$, $ZnF_2$, $ZrF_4$, $AlF_3$, $BaF_2$, $CaF_2$, $CuF_2$, $FeF_2$, $InF_3$, LiF, $MgF_2$, $PbF_2$, $SrF_2$, $UF_4$, $VF_3$-$3H_2O$, $BiF_3$, $CeF_3$, $CrF_2/CrF_3$, $GaF_3$, $LaF_3$, $NdF_3$, and $ThF_4$.

In another aspect, the present invention provides a solution containing one or more dissociating agents having chemical properties specifically tailored for dissolving a LiF salt in a solvent or combination of solvents. In an embodiment, a solution of this aspect comprises: (i) one or more solvents; (ii) a dissociating agent provided to the one or more solvents, the dissociating agent comprising one or more compounds selected from the group consisting of a Lewis acid, a Lewis base; and a crown ether; and (iii) LiF dissolved in the one or more solvents having the dissociating agent, wherein the concentration of LiF dissolved in said one or more solvents is greater than or equal to 0.15 M. Specific embodiments of this aspect of the present invention provide for the dissolution of LiF so as to generate a concentration of dissolved LiF in the solvent(s) selected over the range of 0.15 M to 3M, preferably for some applications selected over the range of 0.5 M to 1 M. This aspect of the present invention further provides methods of dissolving LiF in a solvent or combination of solvents comprising the steps of providing a dissociating agent comprising a Lewis acid, a Lewis base, a crown ether or combination of these to the solvent(s) and dissolving the LiF into the solvent(s) containing the dissociating agent.

Selection of the composition and concentration of the dissociating agent determines, at least in part, the composition, chemical properties and/or physical properties of the solutions and formulations of this aspect of the present invention. For example, the composition and concentration of dissociating agents in solutions and methods of the present invention are important parameters for achieving a desired extent of dissolution of an inorganic fluoride such as LiF. Useful dissociating agents in some embodiments include Lewis acids, Lewis bases, anion receptors, cation receptors, complexing agents, adduct formation agents and combinations of these compounds. In some embodiments, the dissociating agent is provided in the one or more solvents at a concentration selected over the range of 0.01 M to 10 M, and preferably for some applications selected over the range of 0.1 M to 5 M, and more preferably for some applications selected over the range of 0.5 M to 1.5 M. Other properties of dissociating agents useful for some embodiments include chemical stability (for example in the presence of lithium metal), electrochemical stability under discharge or charge conditions in an electrochemical cell, low viscosity impact when provided to solution, thermal stability and an enhancement in ionic conductivity when provided to solution. In some embodiments for lithium battery applications, dissociating reagents do not significantly undergo intercalation reactions at the electrodes.

Lewis acids and Lewis bases are a particularly useful class of dissociating agents in the present solutions, formulations and methods. As used herein, the term "Lewis acid" refers to a substance which, in solution, is able to generate a cation or combine with an anion, and/or a molecule which can accept a pair of electrons and form a coordinate covalent bond, and the term "Lewis base" refers to a substance which, in solution, is able to generate an anion or combine with a cation, and/or a molecule or ion that can form a coordinate covalent bond by donating a pair of electrons. Useful Lewis base or Lewis acid dissociating agents provided to solutions of the present invention include, but are not limited to, inorganic fluorides, inorganic chlorides, inorganic carbonates, and inorganic oxides. In an embodiment, for example, the dissociating agent is one or more Lewis base selected from the group consisting of $AlCl_4^-$, $ClO_4^-$, $SnCl_6^{2-}$, $BF_4^-$, $PF_6^-$, and $AsF_6^-$. In an embodiment, for example, the dissociating agent is one or more Lewis acid selected from the group consisting of $BF_3$, $PF_5$, $SbF_5$, $AsF_5$, $AlCl_3$, $SnCl_4$, $FeCl_3$, $NbCl_5$, $TiCl_4$, and $ZnCl_2$.

In an embodiment, a dissociating agent comprising one or more Lewis acid and/or Lewis base is provided at a concentration in the solution selected over the range of 0.1M to 10M, a preferably for some applications selected over the range of 0.5M to 3M. Lewis acids and bases may be provided to solutions of the present invention via providing a precursor compound to the solution. In the context of the description the term "precursor compound" refers to a substance that generates a Lewis acid, Lewis base or both in solution when provided to a solvent or combination of solvents. In an embodiment, for example, the dissociating agent is provided by dissolving a precursor compound in the one or more solvents to generate a Lewis base, a Lewis acid or a combination of a Lewis acid and a Lewis base, wherein the precursor compound comprises an alkali metal salt, alkaline earth metal salt; a transition metal salt, a rare earth metal salt, or an ammonium salt having the formula:

$$AX; \quad (F3)$$

wherein A is selected from the group consisting of a metal, a metal cation and an ammonium group; and wherein X is selected from the group consisting of a fluorinated anion, a perchlorate group, an imide group, a carbide group, a carbonate group, an oxide group and a chloride group. Lithium salts are precursors useful for generating Lewis acids and/or Lewis bases in some solutions and methods of the present invention. Precursor compounds useful in the present solutions, formulations and methods include, but are not limited to, $LiPF_6$, $LiBF_4$, $LiAsF_6$, $LiClO_4$, $LiSnCl_5$, $LiAlCl_4$, $LiFeCl_4$, $LiNbCl_6$, $LiTiCl_5$, $LiZnCl_3$, $NaPF_6$, $NaBF_4$, $NaAsF_6$, $NaClO_4$, $NaSnCl_5$, $NaAlCl_4$, $NaFeCl_4$, $NaNbCl_6$, $NaTiCl_5$, $NaZnCl_3$, $KPF_6$, $KBF_4$, $KAsF_6$, $KClO_4$, $KSnCl_5$, $KAlCl_4$, $KFeCl_4$, $KNbCl_6$, $KTiCl_5$, $KZnCl_3$, $NH_4PF_6$, $NH_4BF_4$, $NH_4AsF_6$, $NH_4ClO_4$, $NH_4SnCl_5$, $NH_4AlCl_4$, $NH_4FeCl_4$, $NH_4NbCl_6$, $NH_4TiCl_5$, $NH_4ZnCl_3$, $N(CH_3)_4ClO_4$, $N(CH_3)_4SnCl_5$, $N(CH_3)_4AlCl_4$, $N(CH_3)_4FeCl_4$, $N(CH_3)_4NbCl_6$, $N(CH_3)_4TiCl_5$, $N(CH_3)_4ZnCl_3$, $N(C_2H_7)_4ClO_4$, $N(C_2H_7)_4SnCl_5$, $N(C_2H_7)_4AlCl_4$, $N(C_2H_7)_4FeCl_4$, $N(C_2H_7)_4NbCl_6$, $N(C_2H_7)_4TiCl_5$, and $N(C_2H_7)_4ZnCl_3$.

Cation receptors are another particularly useful class of dissociating agents in the present solutions, formulations and methods. As used herein, the term "cation receptor" refers to a molecule or ion which can bind or otherwise take up a cation in solution. Some solutions of the present invention comprise one or more cation receptors selected from the group consisting of a crown ether, a Lewis base, and a cation complexing agent. In an embodiment, a dissociating agent comprising one or more cation receptor is provided at a concentration in the solution selected over the range of 0.1 M to 10M, a preferably for some applications selected over the range of 0.3M to 5M.

Crown ethers are a class of cation receptor exhibiting chemical and physical properties beneficial for enhancing the dissolution of inorganic fluorides, including LiF. These compounds are useful for complexing with metal ions in solution. Crown ether cation receptors useful in the present invention include, but are not limited to, Benzo-15-crown-5, 15-Crown-5, 18-Crown-6, Cyclohexyl-15-crown-5, Dibenzo-18-crown-6, Dicyclohexyl-18-crown-6, Di-t-butyldibenzo-18-crown-6, 4,4i⁻(5i⁻)-Di-tert-butyldibenzo-24-crown-8,4-Aminobenzo-15-Crown-5, Benzo-15-Crown-5, Benzo-18-crown-6,4-tert-Butylbenzo-15-crown-5,4-tert-Butylcyclohexano-15-crown-5,18-Crown-6, Cyclohexano-15-crown-5, Di-2,3-naphtho-30-crown-10, 4,4'(5')-Di-tert-butyldibenzo18-crown-6,4'-(5')-Di-tert-butyldicyclohexano-18-crown-6, 4,4' (5')-Di-tert-butyldicyclohexano-24-crown-8, 4,10-Diaza-15-crown-5, Dibenzo-18-crown-6, Dibenzo-21-crown-7, Dibenzo-24-crown-8, Dibenzo-30-crown-10, Dicyclohexano-18-crown-6, Dicyclohexano-21-crown-7,Dicyclohexano-24-crown-8, 2,6-Diketo-18-crown-6,2,3-Naphtho-15-crown-5,4'-Nitrobenzo-15-crown-5, Tetraaza-12-crown-4 tetrahydrochloride, Tetraaza-12-crown-4 tetrahydrogen sulfate, 1,4,10,13-Tetraoxa-7,16-diazacyclooctadecane, 12-crown-4,15-crown-5, and 21-crown-7. In an embodiment, a crown ether dissociating agent is provided to the solvent at a concentration in the solution selected over the range of 0.1 M to 10M, a preferably for some applications selected over the range of 0.5M to 3M.

Anion receptors are another particularly useful class of dissociating agents in the present solutions, formulations and methods. As used herein, the term anion receptor refers to a molecule or ion which can bind or otherwise take up an anion in solution. Anion receptors useful in the present solutions, formulations and methods include, but are not limited to fluorinated and semifluorinated borate compounds, fluorinated and semifluorinated boronate compounds, fluorinated and semifluorinated boranes, phenyl boron compounds, aza-ether boron compounds, Lewis acids, cyclic polyammonium compounds, guanidinium compounds, calixarene compounds, aza-ether compounds, quaternary ammonium compounds, amines, imidazolinium based receptors, mercury metallacycle compounds, silicon containing cages, and macrocycles. In an embodiment, a dissociating agent comprising one or more anion receptor is provided at a concentration in the solution selected over the range of 0.1 M to 10M, a preferably for some applications selected over the range of 0.5M to 3M.

Examples of calixarene compounds include cobaltocenium-based receptors, ferrocene-based receptors, π-metallated cationic hosts, calix[4]arenes, and calix[6]arenes. Examples of aza-ether anion receptors include linear aza-ethers, multi-branched aza-ethers, and cyclic aza-crown ethers. Examples of mercury metallacycle anion receptors include mercuracarborands and perfluoro-o-phenylenemercury metallacycles. Examples of anion receiving silicon-containing cages and macrocycles includes silsesquioxane cages and crown silanes. Other examples of useful anion receptors can generally be found in the art [See, e.g., Dietrich, *Pure & Appl. Chem.*, Vol 65, No. 7, pp. 1457-1464,1993; U.S. Pat. No. 5,705,689; U.S. Pat. No. 6,120,941; Matthews and Beer, *Calixarene Anion Receptors*, in *Calixarenes* 2001, pp. 421-439, Kluwer Academic Publishers, The Netherlands; Rodionov, *State of the Art in Anion Receptor Design*, American Chemical Society Division of Organic Chemistry Fellowship Awardee Essay 2005-2006; H. S. Lee, X. Q. Yang, C. L. Xiang, J. McBreen, L. S. Choi, "The Synthesis of a New Family of Boron-Based Anion Receptors and the Study of Their Effect on Ion Pair Dissociation and Conductivily of Lithium Salts in Nonaqueous Solutions", J. Electrochem. Soc., Vol. 145, No. 8, August 1998; H. S. Lee, Z. F. Ma, X. Q. Yang, X. Sun and J. McBreen, "Synthesis of a Series of Fluorinated Boronate Compounds and Their Use as Additives in Lithium Battery Electrolytes", Journal of The Electrochemical Society, 151 (9)A1429-A1435 (2004); and X. Sun, H. S. Lee, S. Lee, X. Q. Yang and J. McBreen, "A Novel Lithium Battery Electrolyte Based on Lithium Fluoride and a Tris(pentafluorophenyl) Borane Anion Receptor in DME" Electrochemical and Solid-State Letters, 1 (6) 239-240 (1998), all of which are incorporated by reference to the extent not inconsistent with the present description.

Solutions, formulations, and methods of the present invention are compatible with a range of solvents, including water, nonaqueous organic solvents and nonaqueous inorganic solvents. In some embodiments useful for providing electrolytes for electrochemical cells, such as lithium electrochemical cells, the solvent(s) comprises one or more polar nonaqueous solvents, such as linear and cyclic esters, linear and cyclic ethers and polar carbonates. Electrolytes of the present invention may comprise a single nonaqueous solvent or a combination of nonaqueous solvents provided in relative proportions useful for a given electrochemical device or application. The composition of nonaqueous solvents in some embodiments of the present invention is selected to provide electrolyte formulations having desired physical, electronic and chemical properties, such as ionic conductivities, viscosities, melting points, freezing points and stability with respect to electrolytic decomposition and/or reaction with lithium metal. Useful solvents in the present invention include, but are not limited to, one or more of γ-butyrolactone, propylene carbonate, dimethyl carbonate, ethylene carbonate, acetonitrile, 1,2,-dimethoxy ethane, N,N-dimethyl formamide, dimethyl sulfoxide, 1,3-diolane, methyl formate, nitromethane, phosphoroxichloride, thionylchloride, sulfurylchloride, diethyl ether, diethoxy ethane, 1,3-dioxolane, tetrahydrofuran, 2-methyl-THF, diethyl carbonate, ethyl methyl carbonate, methylacetate and tratahydrofurane.

In another aspect, solutions and formulations of the present invention provide electrolyte compositions useful for electrochemical storage and conversion applications. In these embodiments, inorganic fluoride, dissociating agent and solvent components are selected to provide solution properties useful for a target electrochemical device application. In some embodiments of this aspect, for example, the composition of solution components of an electrolyte are selected to establish useful chemical and physical properties, such as large ionic conductivities, and enhanced solubility for solutions containing inorganic fluorides that are relatively insoluble in pure nonaqueous organic solvents. The present invention includes electrolytes, including nonaqueous electrolytes, exhibiting a high degree of chemical and electrochemical stability. In an embodiment, for example, an electrolyte of the present invention has a high voltage stability window over 5V vs. $Li^+/Li$. In another embodiment, electrolyte formulations of the present invention are stable with respect to contact with Li metal under discharge or charging conditions. A electrolyte of the present invention has an ionic conductivity at 25 degrees Celsius greater than or equal to $10^{-4}$ S cm$^{-1}$, preferably for some applications greater than or equal to $10^{-3}$ S cm$^{-1}$, and more preferably for some applications greater than or equal to $5 \times 10^{-3}$ S cm$^{-1}$. A nonaqueous electrolyte of the present invention has a viscosity at 25 degrees Celsius less than or equal to 5 cP, more preferably for some applications less than or equal to 3 cP.

Although the present invention encompasses electrolytes comprising a broad range of inorganic fluorides, a preferred class of electrolytes for lithium electrochemical cells comprises LiF and a dissociating agent provided in one or more nonaqueous organic solvents. In this aspect, the present invention provides electrolyte formulations having an inorganic fluoride component comprising LiF salt and a dissociating agent capable of significantly enhancing the dissociation and solubility of LiF in organic solvent(s). Embodiments of this aspect are particularly useful for electrolytes of electrochemical cells because F is the most electronegative element and Li is the most electropositive element. Therefore, electrolytes of the present invention comprising LiF are particularly attractive for providing electrochemical cells having enhanced cell voltages and specific capacities relative to conventional lithium electrochemical cells. Dissociating agents of the present invention are capable of increasing the conductivity of LiF in a selected nonaqueous organic solvent or combination of nonaqueous organic solvents, at 25° C., to a value equal to or greater than $10^{-4}$ cm$^{-1}$, preferably equal to or greater $5 \times 10^{-4}$ cm$^{-1}$, and more preferably equal to or greater $10^{-3}$ cm$^{-1}$. In an embodiment, dissociating agents of the present invention increase the solubility of LiF in a selected nonaqueous organic solvent (or combination of solvents) from a low value (e.g., on the order of micromolar) to 0.1 M or greater, preferably 0.5 M or greater, and preferably 1 M or greater. In an embodiment, LiF solubility at a temperature of about 25° C. in an electrolyte of the present invention is increased by addition of a dissociating agent to a value greater than about 0.1 M, including between about 0.1 M to 5 M, and between about 1 M to 2 M.

The present invention includes electrochemical devices comprising the present electrolytes, such as nonaqueous electrolytes, including, but not limited to, primary electrochemical cells, secondary electrochemical cells, capacitors, supercapacitors and fuel cells. In addition, the solutions, dissociating agents and methods of the present invention are also useful for sensing systems, including electrochemical sensing systems. Solutions and dissociating agents of the present invention, for example, are useful for reducing interference and enhancing the selectivity of fluoride ion specific electrodes. In an embodiment, the present invention provides an electrochemical cell comprising: (i) a positive electrode; (ii) a negative electrode; and (iii) an electrolyte of the present invention provided between the positive electrode and the negative electrode. As will be appreciated by those having skill in the art of electrochemistry, electrolytes useful in electrochemical devices of the present invention include those provided throughout the present description. In an embodiment, an electrolyte of an electrochemical device of the present invention comprises (i) one or more solvents; (ii) a dissociating agent provided to the one or more solvents; and (iii) an inorganic fluoride dissolved in the one or more solvents having the dissociating agent; wherein the dissociating agent and inorganic fluoride are provided in amounts sufficient to generate a concentration of inorganic fluoride dissolved in the one or more solvents greater than or equal to 0.15 M.

As will be appreciate by those of skill in the art a wide range of electrode materials and configurations can be used in electrochemical devices of the present invention, including metallic and semiconducting materials. Use of nanostructured and/or intercalating electrodes is useful for some applications. In an embodiment, the negative electrode comprises lithium metal, a carbonaceous material, such as graphite, coke, multiwalled carbon nanotubes, multi-layered carbon nanofibers, multi-layered carbon nanoparticles, carbon nanowhiskers and carbon nanorods having lithium storage capability or a lithium metal alloy. In an embodiment, the positive electrode comprises a carbonaceous material, such as graphite, coke, multiwalled carbon nanotubes, multi-layered carbon nanofibers, multi-layered carbon nanoparticles, carbon nanowhiskers and carbon nanorods having fluoride ion storage capability. In an embodiment, positive electrode comprises a carbonaceous material comprises a subfluorinated carbonaceous material having an average stoichiometry $CF_x$, wherein x is the average atomic ratio of fluorine atoms to carbon atoms and is selected from the range of about 0.3 to about 1.0; the subfluorinated carbonaceous material being a multiphase material having an unfluorinated carbon component. In an embodiment, positive electrode comprises a fluorinated element such a transition metal or a rare earth metal having reversible fluorine ion storage capability.

Solutions, dissociating agents and methods of the present invention providing enhanced solubility of fluorides have significant applications in addition to their use as electrolytes in electrochemical devices and systems. The compositions and methods of the present invention are beneficial for accessing solution phase compositions and properties (e.g., chemical, physical and/or electrochemical) useful for enabling a broad class of surface phase and solution synthetic pathways and other processes. Fluoride containing solutions of the present invention, for example, may provide solution phase reagents for important synthetic chemistries, including organic and inorganic fluorination, for example by soft chemistry methods, and surface fluorination reactions. Fluoride containing solutions of the present invention may also be useful for accessing solution properties (e.g., ionic conductivities, ionic strength, etc.) critical for accessing important solution phase processes, including electrosynthesis, electrodeposition, and electropassivation.

In another aspect, the present invention provides a method for dissolving an inorganic fluoride in one or more solvents comprising the steps of: (i) providing the one or more solvents; (ii) providing a dissociating agent to the one or more solvents; and (iii) dissolving the inorganic fluoride in the one or more solvents having the dissociating agent; wherein the dissociating agent and inorganic fluoride are provided in amounts sufficient to generate a concentration of inorganic fluoride dissolved in the one or more solvents greater than or equal to 0.15 M, thereby dissolving the inorganic fluoride into the one or more solvents.

In another aspect, the present invention provides a method for dissolving LiF in one or more solvents, comprising the steps of: (i) providing the one or more solvents; (ii) providing a dissociating agent to the one or more solvents, the dissociating agent comprising one or more compound selected from the group consisting of a Lewis acid, a Lewis base; and a crown ether; and dissolving LiF in the one or more solvents having the dissociating agent, wherein the concentration of LiF dissolved in said one or more solvents is greater than or equal to 0.15 M, and optionally greater than or equal to 0.5M.

In another aspect, the present invention provides a method of making an electrolyte for an electrochemical device, the method comprising the steps of: (i) providing one or more solvents; (ii) providing a dissociating agent to the one or more solvents; and (iii) dissolving an inorganic fluoride in the one or more solvents having the dissociating agent; wherein the dissociating agent and inorganic fluoride are provided in amounts sufficient to generate a concentration of inorganic fluoride dissolved in the one or more solvents greater than or equal to 0.15 M, thereby making the electrolyte for the electrochemical device.

In another aspect, the present invention provides a method of making an electrolyte for an electrochemical device, the method comprising the steps of: (i) providing one or more solvents; (ii) providing a dissociating agent to the one or more solvents, the dissociating agent comprising one or more compounds selected from the group consisting of a Lewis acid, a Lewis base; and a crown ether; and (iii) dissolving LiF in the one or more solvents having the dissociating agent, thereby making the electrolyte for the electrochemical device.

In another aspect, the present invention provides a solution having LiF dissolved in one or more solvents, said solution comprising: (i) said one or more solvents; and (ii) LiF dissolved in said one or more solvents; wherein the concentration of LiF dissolved in said one or more solvents is greater than or equal to 0.15 M.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION OF THE INVENTION

Figure 1:
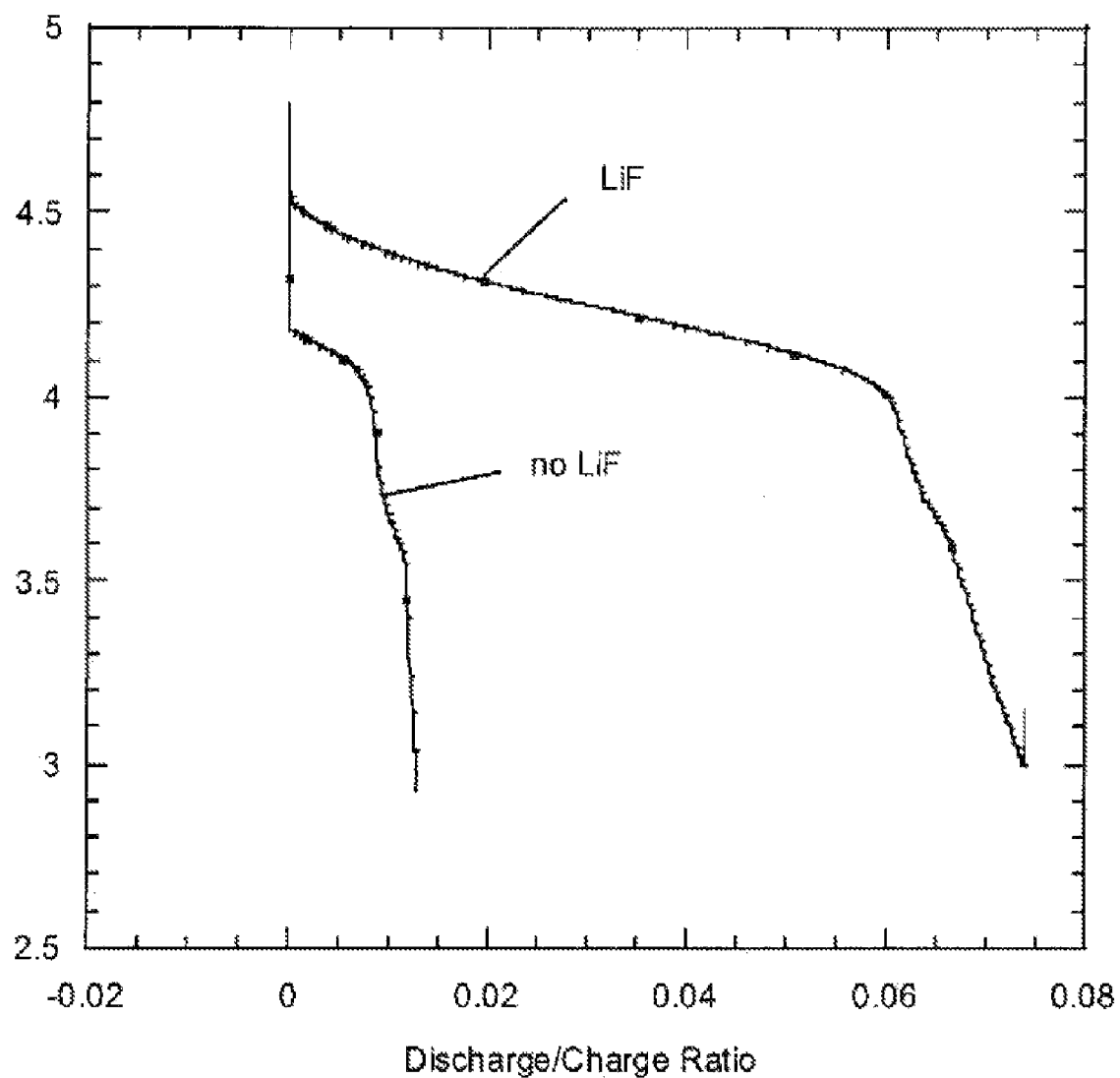
FIG. 1. Comparative (normalized) discharge profile of Li/electrolyte/graphite-based electrode cells with LiF-containing and LiF-free electrolytes consisting of 1 M LiPF$_6$ solution in EC-DMC.

Referring to the drawings, like numerals indicate like elements and the same number appearing in more than one drawing refers to the same element. In general the terms and phrases used herein have their art-recognized meaning, which can be found by reference to standard texts, journal references and contexts known to those skilled in the art. The following definitions are provided to clarify their specific use in the context of the invention.

"Standard electrode potential" (E°) refers to the electrode potential when concentrations of solutes are 1 M, the gas pressures are 1 atm and the temperature is 25 degrees Celsius. As used herein standard electrode potentials are measured relative to a standard hydrogen electrode.

"Intercalation" refers to refers to the process wherein an ion inserts into a host material to generate an intercalation compound via a host/guest solid state redox reaction involving electrochemical charge transfer processes coupled with insertion of mobile guest ions, such as fluoride ions. Major structural features of the host material are preserved after insertion of the guest ions via intercalation. In some host materials, intercalation refers to a process wherein guest ions are taken up with interlayer gaps (e.g., galleries) of a layered host material. Examples of intercalation compounds include fluoride ion intercalation compounds wherein fluoride ions are inserted into a host material, such as a layered fluoride host material or carbon host material. Host materials useful for forming intercalation compounds for electrodes of the present invention include, but are not limited to, CF$_x$, FeFx, MnFx, NiFx, CoFx, LiC$_6$, LixSi, and LixGe.

The term "electrochemical cell" refers to devices and/or device components that convert chemical energy into electrical energy or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries and electrolysis systems. General cell and/or battery construction is known in the art, see e.g., U.S. Pat. Nos. 6,489,055, 4,052, 539, 6,306,540, Seel and Dahn J. Electrochem. Soc. 147(3) 892-898 (2000).

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight. Specific capacity is typically expressed in units of ampere-hours $kg^{-1}$.

The term "discharge rate" refers to the current at which an electrochemical cell is discharged. Discharge current can be expressed in units of ampere-hours. Alternatively, discharge current can be normalized to the rated capacity of the electrochemical cell, and expressed as $C/(X\,t)$, wherein C is the capacity of the electrochemical cell, X is a variable and t is a specified unit of time, as used herein, equal to 1 hour.

"Current density" refers to the current flowing per unit electrode area.

The term "open circuit voltage" refers to the difference in potential between terminals (i.e. electrodes) of an electrochemical cell when the circuit is open (i.e. no load conditions). Under certain conditions the open circuit voltage can be used to estimate the composition of an electrochemical cell. The present methods and system utilize measurements of open circuit voltage for thermochemically stabilized conditions of an electrochemical cell to determine thermodynamic parameters, materials properties and electrochemical properties of electrodes, electrochemical cells and electrochemical systems.

The expression "state of charge" is a characteristic of an electrochemical cell or component thereof (e.g. electrode—cathode and/or anode) referring to its available capacity, such as a battery, expressed as a percentage of its rated capacity.

Electrode refers to an electrical conductor where ions and electrons are exchanged with electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive electrodes and negative electrodes of the present electrochemical cell may further comprise a conductive diluent, such as acetylene black, carbon black, powdered graphite, coke, carbon fiber, and metallic powder, and/or may further comprises a binder, such as a polymer binder. Useful binders for positive electrodes in some embodiments comprise a fluoropolymer such as polyvinylidene fluoride (PVDF). Positive and negative electrodes of the present invention may be provided in a range of useful configurations and form factors as known in the art of electrochemistry and battery science, including thin electrode designs, such as thin film electrode configurations. Electrodes are manufactured as disclosed herein and as known in the art, including as disclosed in, for example, U.S. Pat. Nos. 4,052,539, 6,306,540, 6,852,446. For some embodiments, the electrode is typically fabricated by depositing a slurry of the electrode material, an electrically conductive inert material, the binder, and a liquid carrier on the electrode current collector, and then evaporating the carrier to leave a coherent mass in electrical contact with the current collector.

"Electrode potential" refers to a voltage, usually measured against a reference electrode, due to the presence within or in contact with the electrode of chemical species at different oxidation (valence) states.

"Electrolyte" refers to an ionic conductor which can be in the solid state, the liquid state (most common) or more rarely a gas (e.g., plasma). In the context of an electrochemical cell, the electrolyte provides ionic conductivity between two or more electrodes of an electrochemical cell.

"Cation" refers to a positively charged ion, and "anion" refers to a negatively charged ion.

"Lewis acid" refers to a substance which, in solution, is able to generate a cation or combine with an anion, and/or a molecule which can accept a pair of electrons and form a coordinate covalent bond. Useful classes of Lewis acids include, but are not limited to, inorganic fluorides, inorganic chlorides, inorganic carbonates, and inorganic oxides. Examples of inorganic fluoride Lewis acids are $BF_3$, $PF_5$, $SbF_5$, and $AsF_5$. Examples of inorganic chloride Lewis acids are $AlCl_3$, $SnCl_4$, $FeCl_3$, $NbCl_5$, $TiCl_4$, and $ZnCl_2$.

"Lewis base" refers to a substance which, in solution, is able to generate an anion or combine with a cation, and/or a molecule or ion that can form a coordinate covalent bond by donating a pair of electrons. Useful classes of Lewis bases include, but are not limited to, inorganic fluorides, inorganic chlorides, inorganic carbonates, and inorganic oxides. Examples of inorganic chloride Lewis bases are $AlCl_4^-$, $ClO_4^-$, and $SnCl_6^{2-}$. Examples of inorganic fluoride Lewis bases are $BF_4^-$, $PF_6^-$, and $AsF_6^-$.

"Lewis acid precursor" or "precursor" and "Lewis base precursor" or "precursor" refers to a substance which is able to generate Lewis acids and/or Lewis bases when introduced into a solvent and/or solution. Examples of Lewis acid/base precursors are $LiPF_6$, $LiBF_4$, $LiAsF_6$, $LiClO_4$, $LiSnCl_5$, $LiAlCl_4$, $LiFeCl_4$, $LiNbCl_6$, $LiTiCl_5$, $LiZnCl_3$, $NaPF_6$, $NaBF_4$, $NaAsF_6$, $NaClO_4$, $NaSnCl_5$, $NaAlCl_4$, $NaFeCl_4$, $NaNbCl_6$, $NaTiCl_5$, $NaZnCl_3$, $KPF_6$, $KBF_4$, $KAsF_6$, $KClO_4$, $KSnCl_5$, $KAlCl_4$, $KFeCl_4$, $KNbCl_6$, $KTiCl_5$, $KZnCl_3$, $NH_4PF_6$, $NH_4BF_4$, $NH_4AsF_6$, $NH_4ClO_4$, $NH_4SnCl_5$, $NH_4AlCl_4$, $NH_4FeCl_4$, $NH_4NbCl_6$, $NH_4TiCl_5$, and $NH_4ZnCl_3$ and others.

"Anion receptor" refers to a molecule or ion which can bind or otherwise take up an anion. Useful classes of anion receptors include, but are not limited to, fluorinated and semifluorinated borate compounds, fluorinated and semifluorinated boronate compounds, fluorinated and semifluorinated boranes, Lewis acids, cyclic polyammonium compounds, guanidiniums, calixarene compounds, aza-ether compounds, quaternary ammonium, amine, and imidazolinium based receptors, mercury metallacycles, and silicon containing cages and macrocycles. Examples of cyclic polyammonium anion receptors include polyammonium macrocycles, polyammonium macrobicycles, polyammonium macrotricycles, azacrown compounds, protonated tetra-, penta- and hexaamines. Examples of calixarene compounds include cobaltocenium-based receptors, ferrocene-based receptors, Tr-metallated cationic hosts, calix[4]arenes, and calix[6]arenes. Examples of aza-ether anion receptors include linear aza-ethers, multi-branched aza-ethers, and cyclic aza-crown ethers. Examples of mercury metallacycle anion receptors include mercuracarboranes and perfluoro-o-phenylenemercury metallacycles. Examples of anion receiving silicon-containing cages and macrocycles include silsesquioxane cages and crown silanes. Other examples of useful anion receptors can generally be found in the art [See, e.g., Dietrich, Pure & Appl. Chem., Vol 65, No. 7, pp. 1457-1464, 1993; U.S. Pat. No. 5,705,689; U.S. Pat. No. 6,120,941; Matthews and Beer, Calixarene Anion Receptors, in Calixarenes 2001, pp. 421-439, Kluwer Academic Publishers, The Netherlands; Rodionov, State of the Art in Anion Receptor Design, American Chemical Society Division of Organic Chemistry Fellowship Awardee Essay 2005-2006; H. S. Lee, X. Q. Yang, C. L. Xiang, J. McBreen, L. S. Choi, "The Synthesis of a New Family of Boron-Based Anion Receptors and the Study of Their Effect on Ion Pair Dissociation and Conductivily of Lithium Salts in Nonaqueous Solutions", J. Electrochem. Soc., Vol. 145, No. 8, August 1998; H. S. Lee, Z. F. Ma, X. Q. Yang, X. Sun and J. McBreen, "Synthesis of a Series of Fluorinated Boronate Compounds and Their Use as Additives in Lithium Battery Electrolytes", Journal of The Electrochemical Society, 151 (9) A1429-A1435 (2004); and X. Sun, H. S. Lee, S. Lee, X. Q. Yang and J. McBreen, "A Novel Lithium Battery Electrolyte Based on Lithium Fluoride and a Tris(pentafluorophenyl) Borane Anion Receptor in DME" Electrochemical and Solid-State Letters,1 (6) 239-240 (1998).

"Cation receptor" refers to a molecule or ion which can bind or otherwise take up a cation. Useful classes of cation receptors include, but are not limited to, crown ethers, Lewis bases, and other cation complexing agents. Examples of crown ether cation receptors include, but are not limited to, Benzo-15-crown-5, 15-Crown-5, 18-Crown-6, Cyclohexyl-15-crown-5, Dibenzo-18-crown-6, Dicyclohexyl-18-crown-6, Di-t-butyldibenzo-18-crown-6, $4,4i^-(5i^-)$-Di-tert-butyldibenzo-24-crown-8,4-Aminobenzo-15-Crown-5, Benzo-15-Crown-5, Benzo-18-crown-6,4-tert-Butylbenzo-15-crown-5,4-tert-Butylcyclohexano-15-crown-5, 18-Crown-6, Cyclohexano-15-crown-5, Di-2,3-naphtho-30-crown-10, 4,4'(5')-Di-tert-butyldibenzo18-crown-6, 4'-(5')-Di-tert-butyldicyclohexano-18-crown-6, 4,4'(5')-Di-tert-butyldicyclohexano-24-crown-8, 4,10-Diaza-15-crown-5, Dibenzo-18-crown-6, Dibenzo-21-crown-7, Dibenzo-24-crown-8, Dibenzo-30-crown-10, Dicyclohexano-18-crown-6, Dicyclohexano-21-crown-7, Dicyclohexano-24-crown-8,2,6-Diketo-18-crown-6, 2,3-Naphtho-15-crown-5, 4'-Nitrobenzo-15-crown-5, Tetraaza-12-crown-4 tetrahydrochloride, Tetraaza-12-crown-4 tetrahydrogen sulfate, 1,4,10,13-Tetraoxa-7,16-diazacyclooctadecane, 12-crown-4,15-crown-5, and 21-crown-7.

"Dissociating agent" and "dissociation agent" are used synonymously and refer to a compound added to a solution, solvent, and/or electrolyte to increase the solubility and/or dissolution of a salt. Dissociating agents of the present invention are useful for increasing the dissolution of inorganic fluorides, particularly inorganic fluorides, generally regarded to be relatively insoluble, such as LiF.

The present invention provides methods for generating solutions containing large concentrations of dissolved fluoride salts which are generally regarded as insoluble. In another aspect, the present invention provides solutions, solvents, and electrolytes containing large concentrations of dissolved fluoride salts which are generally regarded as insoluble. In an embodiment, compounds are provided to the solutions, solvents, and electrolytes which facilitate dissolution of the fluoride salts. These compounds can be regarded as dissolution, dissolving, dissociating, or dissociation agents, since they provide a means for dissolving normally insoluble compounds. In an embodiment, the fluoride salts are present as solutes in solution at concentrations much larger than that which occurs at a natural equilibrium in a solution that does not contain the dissociating agents. In an embodiment, the fluoride salts are a minor solute component. In another embodiment, the fluoride salts are the most abundant solute present in the solution, solvent, or electrolyte.

The present invention provides additives and methods for dissolving element fluorides ($MF_n$) such as LiF. In an embodiment, for example, organic solutions of lithium salts (LiX), such as $LiPF_6$, $LiBF_4$, $LiAsF_6$ and $LiClO_4$, in carbonate or gamma butyro-lactone (γ-BL) based liquid solvents dissolve a significant amount LiF, whereas, the same solvents without the presence of the LiX salt do not appreciably dissolve LiF. The present methods apply to a variety of other insoluble fluorides ($MF_n$) thus providing a large range of 'complex-type' solutions of $MF_n$+AX, A=alkali metal or $NH_4$, and X=fluorinated anion, perchlorate, imide, carbide. Compositions of the present invention also provide a new family of electrolytes for lithium batteries applications containing LiF dissolved at significant solubilities in nonaqueous organic solvents.

EXAMPLE 1

Electrolytes and Dissociating Agents for Electrochemical Cells

To demonstrate the chemical properties and utility of the present additives, compositions, formulations and methods, electrolytes of the present invention were prepared and integrated into lithium electrochemical cells. The electrolytes evaluated comprise LiF and an appropriate dissociating agent dissolved in a selected nonaqueous organic solvent or combination of nonaqueous organic solvents. The electronic performance of the electrochemical cells was evaluated to demonstrate the beneficial chemical and physical properties of electrolytes of the present invention.

1. Preparation of the mother solutions: 1 M solutions of $LiPF_6$ in EC-DMC and of $LiBF_4$ in γ-BL and of $LiAsF_6$ and of $LiClO_4$ in PC were prepared in a dry box filled with argon. (EC=ethylene carbonate, DMC=dimethyl carbonate and PC=propylene carbonate). These solutions are called 'mother solutions' throughout this description.

2. Dissolving LiF in mother solutions: In a dry box filled with argon, a sample of 5 milliliters ($5 \times 10^{-3}$ mole of LiX) was taken from each of the above described mother solutions and 65 milligrams ($2.5 \times 10^{-3}$ mole) of LiF was added to it. The solution was stirred magnetically until full dissolution of LiF occurred, i.e., the solution becomes clear. The molar ratio LiF/LiX in these solutions is 0.5, with an absolute LiF concentration of 0.5 M.

3. Electrochemical tests: Coin cells were created in a dry box, consisting of a metallic lithium disc (negative pole), a polypropylene microporous separator wet with 'electrolyte', and a composite electrode (positive pole). Two types of composite cathode electrodes were used: a graphite based electrode and a graphite fluoride based electrode. The 'electrolyte' is either the $LiPF_6$ in EC-DMC mother solution or the LiF dissolved in $LiPF_6$ in EC-DMC mother solution.

3a) graphite based cells: The cells were first discharged under a constant current of 10 mA/g-graphite to 250 mV. The 250 mV vs. $Li^+/Li$ Potential was chosen between that of the first passivation (solid electrolyte interphase: SEI formation usually at >500 mV vs. $Li^+/Li$) and that of the lithium intercalation (usually at <200 mV vs. $Li^+/Li$). The cells were then charged to 5V vs. $Li^+/Li$ under the same 10 mA/g-graphite rate. A constant 5V was then applied for several hours to further charge. The cells were then allowed to rest for several hours and were then discharged to 3V under the same 10 mA/g-graphite rate. Following this, the cells were cycled between 3V and 5V several times under the same procedure described above.

Linear voltammetry under a 15 mV/min sweeping rate was also performed on the cell with LiF containing electrolyte in the 2.1-4.8V voltage window.

3b) graphite fluoride based cells: The $CF_x$ material tested here is $CF_{0.53}$ obtained from graphite. The cells were discharged to different depths of discharge (DOD=10, 20, 30, . . . 100%) under constant current (C/20 rate: i.e., 32.1 mA/g-$CF_{0.53}$). The cells were then charged to 4.8V and to 5.0V and allowed to rest for several hours the same constant voltage was applied (4.8 or 5.0V) for several hours to further charge. After this, the cells were discharged to 3V and then recharged to 4.8 V or 5.0 V following the same procedure described above.

4. Results:

4a) Graphite based electrodes: FIG. 1 provides a comparative (normalized) discharge profile of Li/electrolyte/graphite-based electrode cells with LiF-containing and LiF-free electrolytes consisting of 1 M $LiPF_6$ solution in EC-DMC. FIG. 1 shows the voltage versus discharge/charge ratio of the graphite based cells using mother solution electrolyte (no LiF) and LiF dissolved in mother electrolyte (LiF) with charge voltage up to 4.8V. These results indicate that the LiF containing electrolyte has a higher discharge voltage and relative capacity than the non LiF containing electrolyte.

Figure 2:
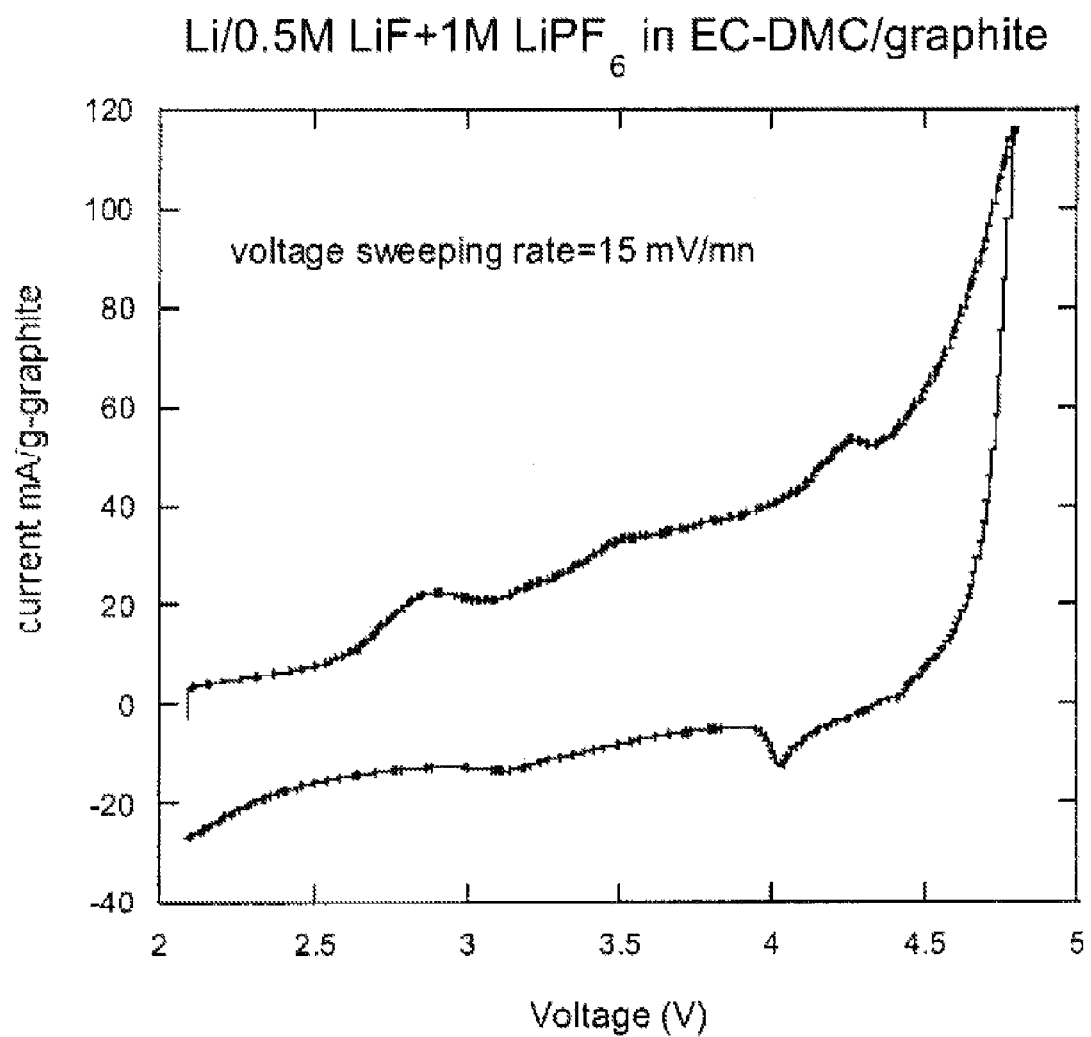
FIG. 2. Shows the cyclic voltammogram obtained with the LiF containing electrolyte cell between 2.1 and 4.8V under 15 mV/mn sweeping rate. It shows oxidation and reduction peaks corresponding to negatively charged species intercalation and de-intercalation into graphite.

FIG. 2 shows a cyclic voltammogram obtained with the Li/0.5M LiF+1 M $LiPF_6$ in EC-DMC/graphite cell, obtained between 2.1 and 4.8 V under a 15 mV/min sweeping rate. Visible in FIG. 2 are oxidation and reduction peaks corresponding to the intercalation and de-intercalation of the negatively charged species into graphite. These positive current (oxidation) peaks and negative current peaks (reduction) peaks correspond to reversible charging and discharging of the cell. The peaks may be associated with negatively charged species (or anions) intercalation and de-intercalation, respectively.

Figure 3:
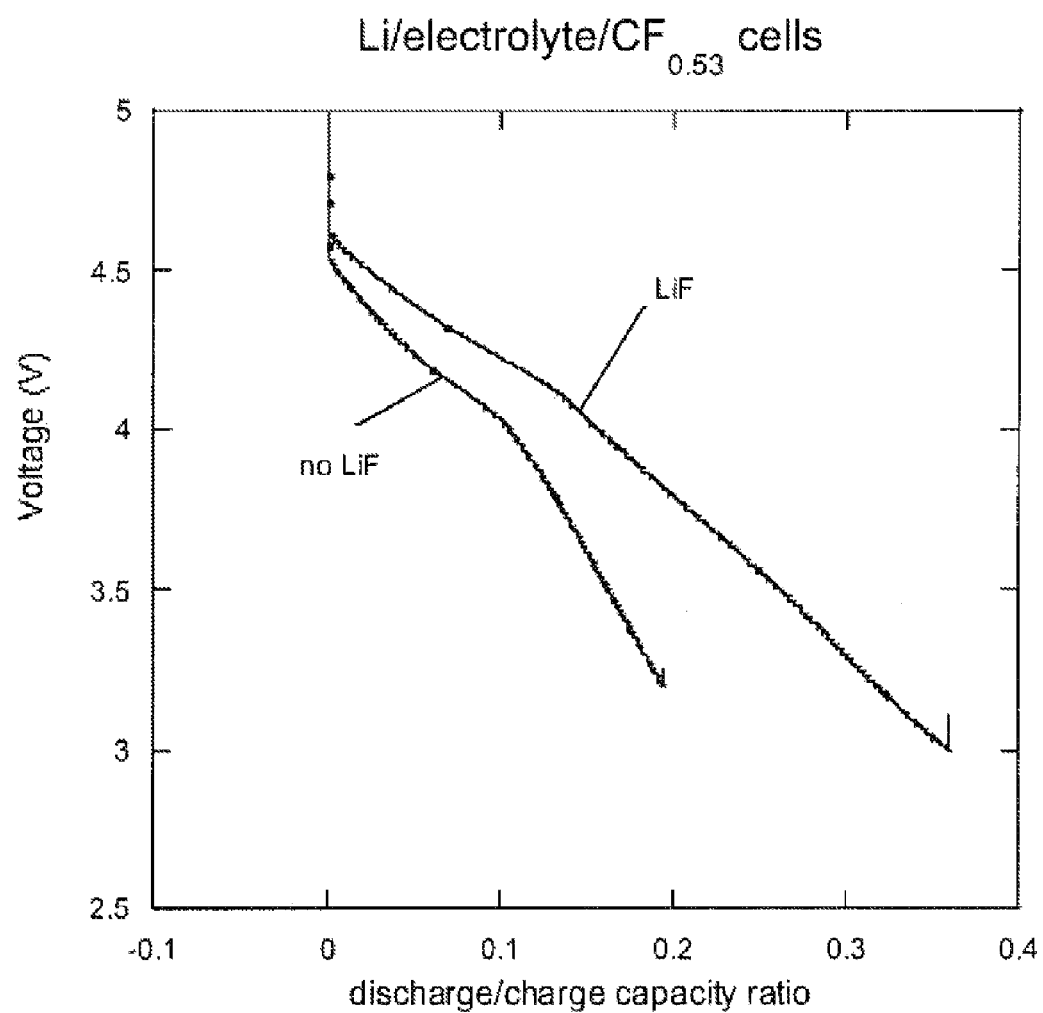
FIG. 3. Comparative (normalized) discharge profile of Li/electrolyte/graphite fluoride (CF$_{0.53}$)-based electrode cells with LiF-containing and LiF-free electrolytes consisting of 1 M LiPF$_6$ solution in EC-DMC.

4b) Graphite fluoride based electrodes: FIG. 3 provides a comparative (normalized) discharge profile of Li/electrolyte/graphite fluoride ($CF_{0.53}$)-based electrode cells with LiF-containing and LiF-free electrolytes consisting of 1 M $LiPF_6$ solution in EC-DMC. FIG. 3 shows the voltage versus discharge/charge capacity ratio of the graphite fluoride ($CF_{0.53}$) based cells using mother solution electrolyte (no LiF) and LiF dissolved in mother electrolyte (LiF) with charge voltage up to 4.8V. These results indicate that the LiF containing electrolyte has a higher discharge voltage and relative capacity than the non-LiF containing electrolyte.

5. Conclusions: New electrolyte solutions based on element fluoride LiF were successfully prepared. The solutions are light transparent and stable under an argon atmosphere. Dissolution of LiF was achieved in different organic liquid media comprised of polar solvents chosen among carbonates such as EC, DMC, PC or γ-butyrolactone and containing a dissolved lithium salt such as $LiPF_6$, $LiBF_4$, $LiAsF_6$ and $LiClO_4$. Electrolyte solutions with LiF have a high voltage stability window over 5V vs. $Li^+$/Li. They are also stable in contact with metallic lithium. LiF containing electrolyte solutions show enhanced electrochemical performances of electrode materials for batteries applications such as those based on pure graphite or graphite fluoride positive electrodes. Dissolution of many insoluble element fluorides can be achieved using the same principle of 'mother solution' electrolytes.

EXAMPLE 2

Comparison of Fluorinated Carbon Electrode Lithium Half-Cells with and without LiF Two fluorinated carbon electrode ($CF_{0.125}$) lithium half cells were prepared. One cell contained an electrolyte of 1 M $LiPF_6$ in propylene carbonate (PC); the other cell contained an electrolyte of 1 M LiF and 1 M 12-crown-4 in PC. The crown ether acts as a cation receptor to allow LiF to dissolve in the PC. The cells were cycled between about 3.2V and 5.5V at a rate of 1 mV/s.

Figure 4:
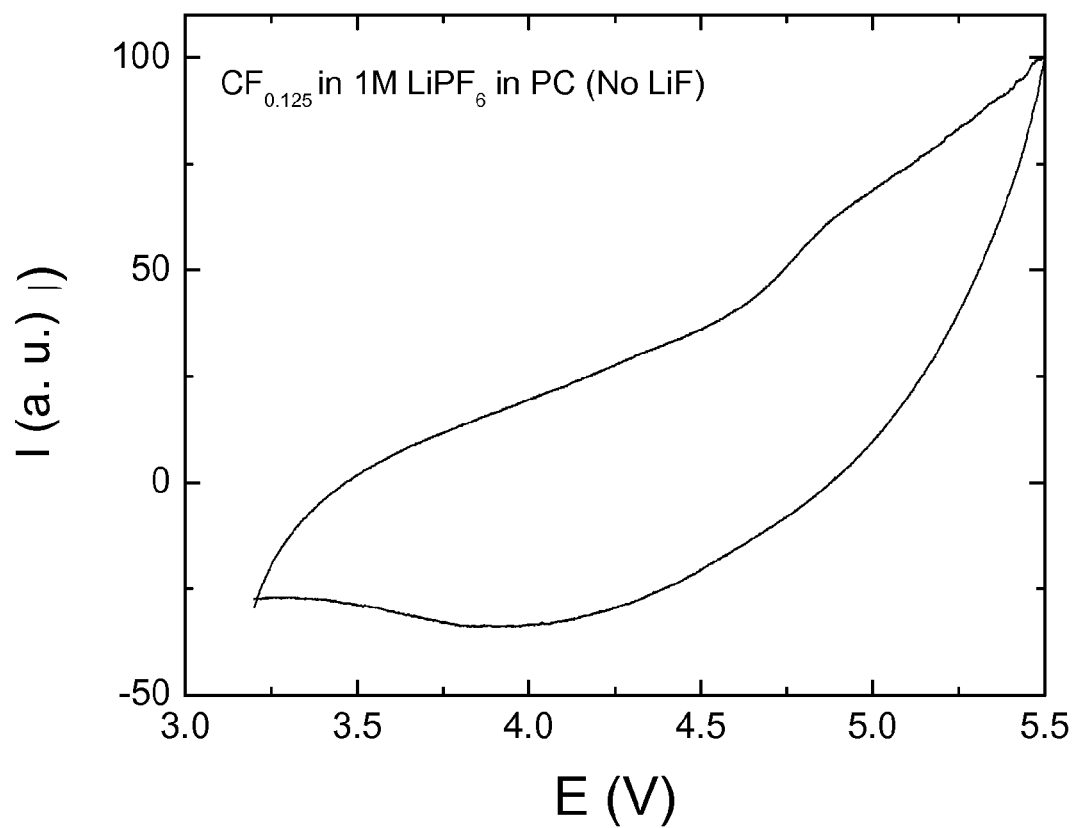
FIG. 4 depicts the current provided by the cell containing LiPF$_6$ during a charge/discharge cycle.

FIG. 4 depicts the current provided by the cell containing $LiPF_6$ during a charge/discharge cycle and shows no clear oxidation or reduction peaks. This cell has a much higher charge capacity than discharge, indicating a large irreversibility.

Figure 5:
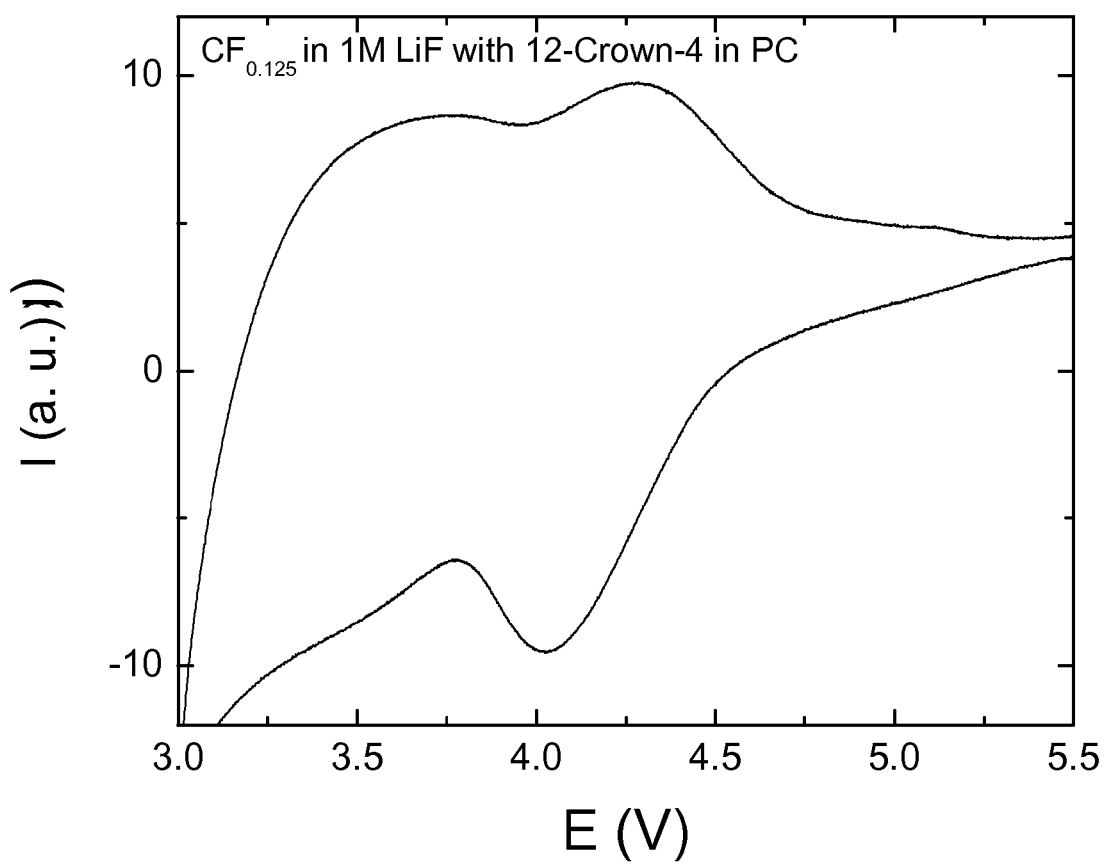
FIG. 5 depicts the current provided by the cell containing LiF and 12-crown-4 during a charge/discharge cycle.

FIG. 5 depicts the current provided by the cell containing LiF during a charge/discharge cycle and shows oxidation peaks at about 3.6V and 4.15V and a reduction peak at about 4 V. This cell has similar charge and discharge capacities, indicating good reversibility.

These results indicate that the presence of dissolved LiF makes fluorinated carbon a suitable cathode for high voltage, high cycleability, rechargeable, fluoride ion batteries, since $F^-$ is able to reversibly intercalate into a fluorinated carbon cathode.

EXAMPLE 3

Fluoride Solutions having Dissociating Agents

Table 2 provides a summary of experimental conditions useful for making fluorides solutions of the present invention from a variety of fluoride salts, including $NH_4F$, NaF, KF, $MgF_2$ and $AlF_3$.

TABLE 2

| | Example Fluoride Solutions | | |
|---|---|---|---|
| | PC or EC/DMC | Crown ether | Anion receptor |
| NH4F | Dissolved in PC. Not in EC/DM. (NH4F was dried in vacuum at 100° C. overnight. 0.185 g NH4F was added into PC and stirred overnight at about 40° C.) | | |
| NaF | X | Dissolved (0.21 g NaF was added into 1.1 g 15-crown-5 (1:1 molar ratio). The mixture was stirred at room temperature for 20 | |

TABLE 2-continued

Example Fluoride Solutions

| | PC or EC/DMC | Crown ether | Anion receptor |
|---|---|---|---|
| | | minutes. Add 4 ml PC to reach 5 ml in total volume. Stirring solution overnight at about 40° C.) | |
| KF | X | Dissolved (0.29 g KF and 1.32 g 18-crown-6 were added into 5 ml PC. The solution was stirred overnight at about 40° C.) | |
| MgF2 | X | | Dissolved Yellow color solution (0.1 g Tris(pentafluorophenyl) borane was dissolved in 5 ml PC. 0.31 g MgF2 was mixed with the solution and stirred overnight at about 40° C.) |
| AlF3 | X | | X |

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. An electrochemical cell comprising a positive electrode, a negative electrode and an electrolyte positioned between said positive electrode and said negative electrode, said electrolyte comprising a solution having an inorganic fluoride dissolved in one or more solvents, said solution comprising:
   said one or more solvents;
   a dissociating agent provided to said one or more solvents; said dissociating agent comprising one or more compounds selected from the group consisting of a Lewis base and a cation receptor; and
   said inorganic fluoride dissolved in said one or more solvents having said dissociating agent; wherein said inorganic fluoride is LiF;
   wherein said dissociating agent and inorganic fluoride are provided in amounts sufficient to generate a concentration of inorganic fluoride dissolved in said one or more solvents greater than or equal to 0.15 M;
   wherein said negative electrode comprises a negative electrode active material selected from the group consisting of lithium metal, a lithium metal alloy, an intercalation host material, a carbonaceous material and a lithium storage material; and
   wherein said positive electrode comprises a positive electrode active material selected from the group consisting of an intercalation host material, a carbonaceous material, a subfluorinated carbonaceous material and a fluorine ion storage material.

2. The electrochemical cell of claim 1 wherein said dissociating agent and inorganic fluoride are provided in amounts sufficient to generate a concentration of said inorganic fluoride dissolved in said one or more solvents selected from the range of 0.15 M to 3 M.

3. The electrochemical cell of claim 1 wherein said dissociating agent and inorganic fluoride are provided in amounts sufficient to generate a concentration of said inorganic fluoride dissolved in said one or more solvents selected from the range of 0.5 M to 1 M.

4. The electrochemical cell of claim 1 wherein a molar ratio of inorganic fluoride dissolved in said one or more solvents to dissociating agent dissolved in said one or more solvents is greater than or equal to 0.1.

5. The electrochemical cell of claim 1 wherein a molar ratio of inorganic fluoride dissolved in said one or more solvents to dissociating agent dissolved in said one or more solvents is selected from the range of 0.1 to 10.

6. The electrochemical cell of claim 1 wherein said dissociating agent is provided in said one or more solvents at a concentration selected from the range of 0.1 M to 10 M.

7. The electrochemical cell of claim 1 wherein said dissociating agent is one or more Lewis bases selected from the group consisting of an inorganic fluoride, an inorganic chloride, an inorganic carbonate, and an inorganic oxide.

8. The electrochemical cell of claim 1 wherein said dissociating agent is one or more Lewis bases selected from the group consisting of $AlCl_4^-$, $ClO_4^-$, $SnCl_6^{2-}$, $BF_4^-$, $PF_6^-$, and $AsF_6^-$.

9. The electrochemical cell of claim 1 wherein said dissociating agent is provided by dissolving a precursor compound in said one or more solvents to generate said Lewis base, said precursor compound comprising an alkali metal salt, alkaline earth metal salt; a transition metal salt or an ammonium salt having a formula:

$$AX \qquad \qquad (F3)$$

wherein A is selected from the group consisting of a metal, a metal cation and an ammonium group; and wherein X is selected from the group consisting of a fluorinated anion, a perchlorate group, an imide group, a carbide group, a carbonate group, an oxide group and a chloride group.

10. The electrochemical cell of claim 9 wherein said precursor compound is one or more lithium salt.

11. The electrochemical cell of claim 9 wherein said precursor compound is one or more salts selected from the group consisting of $LiPF_6$, $LiBF_4$, $LiAsF_6$, $LiClO_4$, $LiSnCl_5$, $LiAlCl_4$, $LiFeCl_4$, $LiNbCl_6$, $LiTiCl_5$, $LiZnCl_3$, $NaPF_6$, $NaBF_4$, $NaAsF_6$, $NaClO_4$, $NaSnCl_5$, $NaAlCl_4$, $NaFeCl_4$, $NaNbCl_6$, $NaTiCl_5$, $NaZnCl_3$, $KPF_6$, $KBF_4$, $KAsF_6$, $KClO_4$, $KSnCl_5$, $KAlCl_4$, $KFeCl_4$, $KNbCl_6$, $KTiCl_5$, $KZnCl_3$, $NH_4PF_6$, $NH_4BF_4$, $NH_4AsF_6$, $NH_4ClO_4$, $NH_4SnCl_5$, $NH_4AlCl_4$, $NH_4FeCl_4$, $NH_4NbCl_6$, $NH_4TiCl_5$, $NH_4ZnCl_3$, $N(CH_3)_4ClO_4$, $N(CH_3)_4SnCl_5$, $N(CH_3)_4AlCl_4$, $N(CH_3)_4FeCl_4$, $N(CH_3)_4NbCl_6$, $N(CH_3)_4TiCl_5$, $N(CH_3)_4ZnCl_3$, $N(C_2H_7)_4ClO_4$, $N(C_2H_7)_4SnCl_5$, $N(C_2H_7)_4AlCl_4$, $N(C_2H_7)_4FeCl_4$, $N(C_2H_7)_4NbCl_6$, $N(C_2H_7)_4TiCl_5$, and $N(C_2H_7)_4ZnCl_3$.

12. The electrochemical cell of claim 1 wherein said dissociating agent comprises one or more cation receptors.

13. The electrochemical cell solution of claim 12 wherein said cation receptor is one or more compounds selected from the group consisting of a crown ether, a Lewis base, and a cation complexing agent.

14. The electrochemical cell of claim 13 wherein said cation receptor is one or more crown ethers selected from the group consisting of Benzo-15-crown-5, 15-Crown-5, 18-Crown-6, Cyclohexyl-15-crown-5, Dibenzo-18-crown-6, Dicyclohexyl-18-crown-6, Di-t-butyldibenzo-18-crown-6, 4,4i⁻(5i⁻)-Di-tert-butyldibenzo-24-crown-8, 4-Aminobenzo-15-Crown-5, Benzo-18-crown-6, 4-tert-Butylbenzo-15-crown-5, 4-tert-Butylcyclohexano-15-crown-5, Cyclohexano-15-crown-5, Di-2,3-naphtho-30-crown-10, 4,4'(5')-Di-tert-butyldibenzo18crown-6, 4'-(5')-Di-tert-butyldicyclohexano-18-crown-6, 4,4'(5')-Di-tert-butyldicyclohexano-24-crown-8, 4,10-Diaza-15-crown-5, Dibenzo-21-crown-7, Dibenzo-24-crown-8, Dibenzo-30-crown-10, Dicyclohexano-18-crown-6, Dicyclohexano-21-crown-7, Dicyclohexano-24-crown-8, 2,6-Diketo-18-crown-6, 2,3-Naphtho-15-crown-5, 4'-Nitrobenzo-15-crown-5, Tetraaza-12-crown-4 tetrahydrochloride, Tetraaza-12-crown-4tetrahydrogen sulfate, 1,4,10,13-Tetraoxa-7,16-diazacyclooctadecane, 12-crown-4, and 21-crown-7.

15. The electrochemical cell of claim 1 wherein said one or more solvents is selected from the group consisting of water, a nonaqueous organic solvent and a nonaqueous inorganic solvent.

16. The electrochemical cell of claim 1 wherein said one or more solvents comprise one or more polar nonaqueous solvents.

17. The electrochemical cell of claim 1 wherein said one or more solvents comprise one or more solvents selected from the group consisting of γ-butyrolactone, propylene carbonate, dimethyl carbonate, ethylene carbonate, acetonitrile, 1,2,-dimethoxy ethane, N,N-dimethyl formamide, dimethyl sulfoxide, 1,3-diolane, methyl formate, nitromethane, phosphoroxichloride, thionylchloride, sulfurylchloride, diethyl ether, diethoxy ethane, 1,3-dioxolane, tetrahydrofuran, 2-methyl-THF, diethyl carbonate, ethyl methyl carbonate, methylacetate and tratahydrofurane.

18. The electrochemical cell of claim 1 wherein said one or more solvents comprise one or more polar carbonates.

19. The electrochemical cell of claim 1 wherein said negative electrode active material comprises graphite, coke, multiwalled carbon nanotubes, multi-layered carbon nanofibers, multi-layered carbon nanoparticles, carbon nanowhiskers or carbon nanorods and wherein said positive electrode active material comprises graphite, coke, multiwalled carbon nanotubes, multi-layered carbon nanofibers, multi-layered carbon nanoparticles, carbon nanowhiskers or carbon nanorods.

20. The electrochemical cell of claim 1 wherein said positive electrode active material comprises a subfluorinated carbonaceous material having an average stoichiometry $CF_x$, wherein x is an average atomic ratio of fluorine atoms to carbon atoms and is selected from the range of about 0.3 to about 1.0; said subfluorinated carbonaceous material being a multiphase material having an unfluorinated carbon component.

21. The electrochemical cell of claim 1 wherein said positive electrode active material comprises a fluorine ion storage material selected from the group consisting of a fluorinated transition metal or a fluorinated rare earth metal.

22. An electrochemical cell comprising a positive electrode, a negative electrode and an electrolyte positioned between said positive electrode and said negative electrode, said electrolyte comprising a solution comprising LiF dissolved in one or more solvents, said solution comprising:

said one or more solvents;
a dissociating agent provided to said one or more solvents, said dissociating agent comprising one or more compounds selected from the group consisting of a Lewis base and a crown ether; and
said LiF dissolved in said one or more solvents having said dissociating agent, wherein a concentration of LiF dissolved in said one or more solvents is greater than or equal to 0.15 M;
wherein said negative electrode comprises a negative electrode active material selected from the group consisting of lithium metal, a lithium metal alloy, an intercalation host material, a carbonaceous material and a lithium storage material; and
wherein said positive electrode comprises a positive electrode active material selected from the group consisting of an intercalation host material, a carbonaceous material, a subfluorinated carbonaceous material and a fluorine ion storage material.

23. The electrochemical cell of claim 22 wherein said dissociating agent and LiF are provided in amounts sufficient to generate a concentration of LiF dissolved in said one or more solvents selected from the range of 0.15 M to 3 M.

24. The electrochemical cell of claim 22 wherein said dissociating agent and LiF are provided in amounts sufficient to generate a concentration of LiF dissolved in said one or more solvents selected from the range of 0.5 M to 1 M.

25. The electrochemical cell of claim 22 wherein said dissociating agent is provided in said one or more solvents at a concentration selected from the range of 0.1 M to 10 M.

26. The electrochemical cell solution of claim 22 wherein said dissociating agent is one or more Lewis bases selected from the group consisting of an inorganic fluoride, an inorganic chloride, an inorganic carbonate, and an inorganic oxide.

27. The electrochemical cell of claim 22 wherein said dissociating agent is one or more Lewis base selected from the group consisting of $AlCl_4^-$, $ClO_4^-$, $SnCl_6^{2-}$, $BF_4^-$, $PF_6^-$, and $AsF_6^-$.

28. The electrochemical cell of claim 22 wherein said dissociating agent is provided by dissolving a precursor compound in said one or more solvents to generate said Lewis base, said precursor compound comprising an alkali metal salt, alkaline earth metal salt; a transition metal salt or an ammonium salt having a formula:

$$AX: \quad \text{(F3)}$$

wherein A is selected from the group consisting of a metal, a metal cation and a ammonium group; and wherein X is selected from the group consisting of a fluorinated anion, a perchlorate group, an imide group, a carbide group, a carbonate group, an oxide group and a chloride group.

29. The electrochemical cell of claim 28 wherein said precursor compound is one or more lithium salts.

30. The electrochemical cell of claim 28 wherein said precursor compound is one or more salt selected from the group consisting of $LiPF_6$, $LiBF_4$, $LiAsF_6$, $LiClO_4$, $LiSnCl_5$, $LiAlCl_4$, $LiFeCl_4$, $LiNbCl_6$, $LiTiCl_5$, $LiZnCl_3$, $NaPF_6$, $NaBF_4$, $NaAsF_6$, $NaClO_4$, $NaSnCl_5$, $NaAlCl_4$, $NaFeCl_4$, $NaNbCl_6$, $NaTiCl_5$, $NaZnCl_3$, $KPF_6$, $KBF_4$, $KAsF_6$, $KClO_4$, $KSnCl_5$, $KAlCl_4$, $KFeCl_4$, $KNbCl_6$, $KTiCl_5$, $KZnCl_3$, $NH_4PF_6$, $NH_4BF_4$, $NH_4AsF_6$, $NH_4ClO_4$, $NH_4SnCl_5$, $NH_4AlCl_4$, $NH_4FeCl_4$, $NH_4NbCl_6$, $NH_4TiCl_5$, $NH_4ZnCl_3$, $N(CH_3)_4ClO_4$, $N(CH_3)_4SnCl_5$, $N(CH_3)_4AlCl_4$, $N(CH_3)_4FeCl_4$, $N(CH_3)_4NbCl_6$, $N(CH_3)_4TiCl_5$, $N(CH_3)_4ZnCl_3$, $N(C_2H_7)_4ClO_4$, $N(C_2H_7)_4SnCl_5$, $N(C_2H_7)_4AlCl_4$, $N(C_2H_7)_4FeCl_4$, $N(C_2H_7)_4NbCl_6$, $N(C_2H_7)_4TiCl_5$, and $N(C_2H_7)_4ZnCl_3$.

31. The electrochemical cell of claim 22 wherein said dissociating agent is one or more crown ethers selected from the group consisting of Benzo-15-crown-5, 15-Crown-5, 18-Crown-6, Cyclohexyl-15-crown-5, Dibenzo-18-crown-6, Dicyclohexyl-18-crown-6, Di-t-butyldibenzo-18-crown-6, 4,4i⁻(5i⁻)-Di-tert-butyldibenzo-24-crown-8, 4-Aminobenzo-15-Crown-5, Benzo-18-crown-6, 4-tert-Butylbenzo-15-crown-5, 4-tert-Butylcyclohexano-15-crown-5, Cyclohexano-15-crown-5, Di-2,3-naphtho-30-crown-10, 4,4'(5')-Di-tert-butyldibenzo18-crown-6, 4'-(5')-Di-tert-butyldicyclohexano-18-crown-6, 4,4'(5')-Di-tert-butyldicyclohexano-24-crown-8, 4,10-Diaza-15-crown-5, Dibenzo-21-crown-7, Dibenzo-24-crown-8, Dibenzo-30-crown-10, Dicyclohexano-18-crown-6, Dicyclohexano-21-crown-7, Dicyclohexano-24-crown-8, 2,6-Diketo-18-crown-6, 2,3-Naphtho-15crown-5, 4'-Nitrobenzo-15-crown-5, Tetraaza-12-crown-4 tetrahydrochloride, Tetraaza-12-crown-4tetrahydrogen sulfate, 1,4,10,13-Tetraoxa-7,16-diazacyclooctadecane, 12-crown-4, and 21-crown-7.

32. The electrochemical cell of claim 22 wherein said one or more solvents is selected from the group consisting of water, a nonaqueous organic solvent and a nonaqueous inorganic solvent.

33. The electrochemical cell of claim 22 wherein said one or more solvents comprise one or more polar nonaqueous solvents.

34. The electrochemical cell of claim 22 wherein said one or more solvents comprise one or more solvents selected from the group consisting of γ-butyrolactone, propylene carbonate, di methyl carbonate, ethylene carbonate, acetonitrile, 1,2,-dimethoxy ethane, N,N-dimethyl formamide, dimethyl sulfoxide, 1,3-diolane, methyl formate, nitromethane, phosphoroxichloride, thionylchloride, sulfurylchloride, diethyl ether, diethoxy ethane, 1,3-dioxolane, tetrahydrofuran, 2-methyl-THF, diethyl carbonate, ethyl methyl carbonate, methylacetate and tratahydrofurane.

35. The electrochemical cell of claim 22 wherein said one or more solvents comprise one or more polar carbonates.

36. The electrochemical cell of claim 22 wherein said negative electrode active material comprises graphite, coke, multiwalled carbon nanotubes, multi-layered carbon nanofibers, multi-layered carbon nanoparticles, carbon nanowhiskers or carbon nanorods and wherein said positive electrode active material comprises graphite, coke, multiwalled carbon nanotubes, multi-layered carbon nanofibers, multi-layered carbon nanoparticles, carbon nanowhiskers or carbon nanorods.

37. The electrochemical cell of claim 22 wherein said positive electrode active material comprises a subfluorinated carbonaceous material having an average stoichiometry $CF_x$, wherein x is an average atomic ratio of fluorine atoms to carbon atoms and is selected from the range of about 0.3 to about 1.0; said subfluorinated carbonaceous material being a multiphase material having an unfluorinated carbon component.

38. The electrochemical cell of claim 22 wherein said positive electrode active material comprises a fluorine ion storage material selected from the group consisting of a fluorinated transition metal and a fluorinated rare earth metal.

39. An electrochemical cell comprising a positive electrode, a negative electrode and an electrolyte positioned between said positive electrode and said negative electrode, said electrolyte comprising:
one or more solvents;
a dissociating agent provided to said one or more solvents; said dissociating agent comprising one or more compounds selected from the group consisting of a Lewis base and a cation receptor; and
an inorganic fluoride dissolved in said one or more solvents having said dissociating agent; wherein said inorganic fluoride is LiF;
wherein said dissociating agent and inorganic fluoride are provided in amounts sufficient to generate a concentration of inorganic fluoride dissolved in said one or more solvents greater than or equal to 0.15 M or selected from the range of 0.5 M to 1 M; wherein a molar ratio of inorganic fluoride dissolved in said one or more solvents to dissociating agent dissolved in said one or more solvents is selected from the range of 0.1 to 10;
wherein said negative electrode comprises a negative electrode active material selected from the group consisting of lithium metal, a lithium metal alloy, an intercalation host material, a carbonaceous material and a lithium storage material; and
wherein said positive electrode comprises a positive electrode active material selected from the group consisting of an intercalation host material, a carbonaceous material, a subfluorinated carbonaceous material and a fluorine ion storage material.

40. The electrochemical cell of claim 39 wherein said negative electrode active material comprises graphite, coke, multiwalled carbon nanotubes, multi-layered carbon nanofibers, multi-layered carbon nanoparticles, carbon nanowhiskers or carbon nanorods and wherein said positive electrode active material comprises graphite, coke, multiwalled carbon nanotubes, multi-layered carbon nanofibers, multi-layered carbon nanoparticles, carbon nanowhiskers or carbon nanorods.

41. The electrochemical cell of claim 39 wherein said positive electrode active material comprises a subfluorinated carbonaceous material having an average stoichiometry $CF_x$, wherein x is an average atomic ratio of fluorine atoms to carbon atoms and is selected from the range of about 0.3 to about 1.0; said subfluorinated carbonaceous material being a multiphase material having an unfluorinated carbon component.

42. The electrochemical cell of claim 39 wherein said positive electrode active material comprises a fluorine ion storage material selected from the group consisting of a fluorinated transition metal and a fluorinated rare earth metal.

43. An electrochemical cell comprising a positive electrode, a negative electrode and an electrolyte positioned between said positive electrode and said negative electrode, said electrolyte comprising:
one or more solvents;
a dissociating agent provided to said one or more solvents, said dissociating agent comprising one or more compound selected from the group consisting of a Lewis base and a crown ether; and
LiF dissolved in said one or more solvents having said dissociating agent, wherein a concentration of LiF dissolved in said one or more solvents is selected from the range of 0.5 M to 1 M;
wherein a molar ratio of inorganic fluoride dissolved in said one or more solvents to dissociating agent dissolved in said one or more solvents is selected from the range of 0.1 to 10;
wherein said negative electrode comprises a negative electrode active material selected from the group consisting of lithium metal, a lithium metal alloy, an intercalation host material, a carbonaceous material and a lithium storage material; and wherein said positive electrode comprises a positive electrode active material selected from the group consisting of an intercalation host material, a carbonaceous material, a subfluorinated carbonaceous material and a fluorine ion storage material.

44. The electrochemical cell of claim 43 wherein said negative electrode active material comprises graphite, coke, multiwalled carbon nanotubes, multi-layered carbon nanofibers, multi-layered carbon nanoparticles, carbon nanowhiskers or carbon nanorods and wherein said positive electrode active material comprises graphite, coke, multiwalled carbon nanotubes, multi-layered carbon nanofibers, multi-layered carbon nanoparticles, carbon nanowhiskers or carbon nanorods.

45. The electrochemical cell of claim 43 wherein said positive electrode active material comprises a subfluorinated carbonaceous material having an average stoichiometry $CF_x$, wherein x is an average atomic ratio of fluorine atoms to carbon atoms and is selected from the range of about 0.3 to about 1.0; said subfluorinated carbonaceous material being a multiphase material having an unfluorinated carbon component.

46. The electrochemical cell of claim 43 wherein said positive electrode active material comprises a fluorine ion storage material selected from the group consisting of a fluorinated transition metal and a fluorinated rare earth metal.

47. An electrochemical cell comprising a positive electrode, a negative electrode and an electrolyte positioned between said positive electrode and said negative electrode, said electrolyte comprising a solution having LiF dissolved in one or more solvents, said solution comprising:

said one or more solvents;

said dissociating agent comprising one or more Lewis bases; and

LiF dissolved in said one or more solvents;

wherein said dissociating agent and LiF are provided in amounts sufficient to generate a concentration of LiF dissolved in said one or more solvents greater than or equal to 0.15 M;

wherein said negative electrode comprises a negative electrode active material selected from the group consisting of lithium metal, a lithium metal alloy, an intercalation host material, a carbonaceous material and a lithium storage material; and wherein said positive electrode comprises a positive electrode active material selected from the group consisting of an intercalation host material, a carbonaceous material, a subfluorinated carbonaceous material and a fluorine ion storage material.

48. The electrochemical cell of claim 47 wherein said negative electrode active material comprises graphite, coke, multiwalled carbon nanotubes, multi-layered carbon nanofibers, multi-layered carbon nanoparticles, carbon nanowhiskers or carbon nanorods and wherein said positive electrode active material comprises graphite, coke, multiwalled carbon nanotubes, multi-layered carbon nanofibers, multi-layered carbon nanoparticles, carbon nanowhiskers or carbon nanorods.

49. The electrochemical cell of claim 47 wherein said positive electrode active material comprises a subfluorinated carbonaceous material having an average stoichiometry $CF_x$, wherein x is an average atomic ratio of fluorine atoms to carbon atoms and is selected from the range of about 0.3 to about 1.0; said subfluorinated carbonaceous material being a multiphase material having an unfluorinated carbon component.

50. The electrochemical cell of claim 47 wherein said positive electrode active material comprises a fluorine ion storage material selected from the group consisting of a fluorinated transition metal and a fluorinated rare earth metal.

* * * * *

UNITED STATES PATENT AND TRADEMARK OFFICE
CERTIFICATE OF CORRECTION

PATENT NO.         : 8,658,309 B2
APPLICATION NO.    : 11/837004
DATED              : February 25, 2014
INVENTOR(S)        : Rachid Yazami Page 1 of 1

It is certified that error appears in the above-identified patent and that said Letters Patent is hereby corrected as shown below:

In the Claims:

In claim 14, column 25, line 14, replace "4,4'(5')-Di-tert-butyldibenzo18crown-6" with --4,4'(5')-Di-tert-butyldibenzo-18-crown-6--.

In claim 14, column 25, line 21, replace "Tetraaza-12-crown-4tetrahydrogen sulfate" with --Tetraaza-12-crown-4 tetrahydrogen sulfate--.

In claim 26, column 26, line 31, replace "The electrochemical cell solution of claim 22" with --The electrochemical cell of claim 22--.

In claim 28, column 26, line 50, replace "a ammonium group" with --an ammonium group--.

In claim 31, column 27, line 20, replace "2,3-Naptho-15crown-5" with --2,3-Naptho-15-crown-5--.

In claim 31, column 27, line 21, replace "Tetraaza-12-crown-4tetrahydrogen sulfate" with --Tetraaza-12-crown-4 tetrahydrogen sulfate--.

In claim 34, column 27, line 34, replace "di methyl carbonate" with --dimethyl carbonate--.

Signed and Sealed this
Sixteenth Day of February, 2016

Michelle K. Lee
*Director of the United States Patent and Trademark Office*